(12) United States Patent
Hirai et al.

(10) Patent No.: US 6,510,285 B2
(45) Date of Patent: Jan. 21, 2003

(54) STROBE CONTROL DEVICE

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/837,468

(22) Filed: Apr. 19, 2001

(65) Prior Publication Data

US 2001/0036362 A1 Nov. 1, 2001

(30) Foreign Application Priority Data

Apr. 20, 2000 (JP) ........................................ 2000-119661
Aug. 8, 2000 (JP) ........................................ 2000-239415

(51) Int. Cl.⁷ ............................................. G03B 15/05
(52) U.S. Cl. ......................................... 396/159; 396/165
(58) Field of Search ................................. 396/159, 225, 396/165

(56) References Cited

U.S. PATENT DOCUMENTS

| | | | |
|---|---|---|---|
| 3,757,654 A | * 9/1973 | Mori | 396/165 |
| 5,504,553 A | * 4/1996 | Takagi | 396/159 |
| 5,596,387 A | 1/1997 | Takagi | 396/50 |
| 5,710,948 A | 1/1998 | Takagi | 396/50 |
| 5,749,002 A | * 5/1998 | Iwasaki | 396/161 |
| 5,987,265 A | 11/1999 | Iwasaki | 396/225 |
| 6,175,693 B1 | 1/2001 | Iida | 396/121 |

FOREIGN PATENT DOCUMENTS

| | | | |
|---|---|---|---|
| JP | 5-340804 | 12/1993 | G01J/1/02 |
| JP | 7-84299 | 3/1995 | G03B/7/28 |
| JP | 1 0253449 | 9/1998 | G01J/1/44 |
| JP | 2000-310812 | 11/2000 | G03B/17/24 |

* cited by examiner

Primary Examiner—W. B. Perkey
(74) Attorney, Agent, or Firm—Greenblum & Bernstein, P.L.C.

(57) ABSTRACT

A strobe control device for a camera is provided with a light amount measuring system that measures amount of light emitted by a strobe and reflected by an object, a comparing system that compares the measured light amount with a reference exposure light amount. The reference exposure light amount is determined in accordance with a reference control level, the strobe is controlled to stop emitting light when the measured light amount has reached the reference exposure light amount. The strobe control device is further provided with a colorimetry system that determines a color of the object, a reflection compensation value determining system that determines a compensation value for compensating for errors depending on a reflectivity of an object, and a compensation system that compensates for the reference control level in accordance with the reflection compensation value.

12 Claims, 22 Drawing Sheets

| TTL (GAIN:1X)SW2:ON | | | | TTL (GAIN:4X)SW2:OFF | | | |
|---|---|---|---|---|---|---|---|
| SXVD | TTL LEVEL(mV) | D/A STEP | ISO | SXVD | TTL LEVEL(mV) | D/A STEP | ISO |
| 10 0/8 | 2000 | 200H | 25 | 13 0/8 | 1000 | 100H | 200 |
| 10 1/8 | 1834 | 1D5H | | 13 1/8 | 917 | EBH | |
| 10 2/8 | 1682 | 1AEH | | 13 2/8 | 814 | D7H | |
| 10 3/8 | 1542 | 18AH | | 13 3/8 | 771 | C5H | |
| 10 4/8 | 1414 | 16AH | | 13 4/8 | 707 | B5H | |
| 10 5/8 | 1297 | 14CH | | 13 5/8 | 648 | A6H | |
| 10 6/8 | 1189 | 130H | | 13 6/8 | 595 | 98H | |
| 10 7/8 | 1090 | 117H | | 13 7/8 | 545 | 8BH | |
| 11 0/8 | 1000 | 100H | 50 | 14 0/8 | 500 | 80H | 400 |
| 11 1/8 | 917 | EBH | | 14 1/8 | 459 | 75H | |
| 11 2/8 | 814 | D7H | | 14 2/8 | 420 | 6BH | |
| 11 3/8 | 771 | C5H | | 14 3/8 | 386 | 63H | |
| 11 4/8 | 707 | B5H | | 14 4/8 | 354 | 5BH | |
| 11 5/8 | 648 | A6H | | 14 5/8 | 324 | 53H | |
| 11 6/8 | 595 | 98H | | 14 6/8 | 297 | 4CH | |
| 11 7/8 | 545 | 8BH | | 14 7/8 | 273 | 46H | |
| 12 0/8 | 500 | 80H | 100 | 15 0/8 | 250 | 40H | 800 |
| 12 1/8 | 459 | 75H | | 15 1/8 | 229 | 3BH | |
| 12 2/8 | 420 | 6BH | | 15 2/8 | 210 | 36H | |
| 12 3/8 | 386 | 63H | | 15 3/8 | 193 | 31H | |
| 12 4/8 | 354 | 5BH | | 15 4/8 | 177 | 2DH | |
| 12 5/8 | 324 | 53H | | 15 5/8 | 162 | 29H | |
| 12 6/8 | 297 | 4CH | | 15 6/8 | 149 | 26H | |
| 12 7/8 | 273 | 46H | | 15 7/8 | 136 | 23H | |
| | | | | 16 0/8 | 125 | 20H | 1600 |

FIG. 9

(EEPROM)

| | | THvalue | coefficient | CCcoefficient | CCadjustment |
|---|---|---|---|---|---|
| GREEN | g1 | 8 | 3/4 | 0 | 0 |
| | g2 | | 3/4 | | |
| BLUE | b1 | 8 | 3/4 | 2/16 | 2 |
| | b2 | | 3/4 | | |
| RED | r1 | 15 | 3/4 | 1/16 | 2 |
| | r2 | | 3/4 | | |
| MAGENTA | m1 | −40 | | 0 | 0 |
| YELLOW | y1 | −9 | | 1 | −4 |
| CYAN | c1 | −40 | | 0 | 0 |

FIG.20

STROBE CONTROL DEVICE

BACKGROUND OF THE INVENTION

The present invention relates to a strobe light control device, which detects the strobe light reflected by an object and control the emission of the strobe light. In particular, the invention relates to a strobe light control device which enables an appropriate exposure regardless of the difference of reflectivity of various objects.

Recently, as a strobe device for a camera, a so-called auto-strobe device is employed. The auto-strobe device is configured to detect strobe light reflected by an object, and to control the strobe to stop light emission when the light amount received from the object has reached a predetermined amount. With this control, the object is exposed to light appropriately.

In such an auto-strobe device, however, the reflectivity of an object is generally assumed to be 18% and the exposure parameter is determined on this assumption. Therefore, regarding a whitish object whose reflectivity is greater than 18%, the photometry value of the reflected light is relatively great and the light emission of the strove is stopped at an earlier stage, which results in an underexposed condition of the object. On the contrary, regarding a dark object whose reflectivity is less than 18%, the photometry value is relatively small, and the emission of the strobe light is stopped later than necessary. In such a case, the object is overexposed. The difference of the reflectivity of the object occurs not only in a case where the object is whitish or dark, but it may occur for a range of colors of the object. For example, when the color of an object is yellow, the reflectivity may be up to 70%. In such a case, if the standard reflectivity is assumed to be 18%, the exposure value is approximately 2 Ev lower than necessary. If the object color is blue, the reflectivity is approximately 9%. In this case, the object is over exposed by approximately 1 Ev greater than necessary.

Therefore, in the cameras provided with a conventional strobe light control device, the photographer is required to guess the reflectivity of the object. Then, based on the reflectivity determined by the photographer, the exposure using the strobe is controlled such that, if the object is a whitish or yellowish one having a relatively high reflectivity, light emission of the strobe is controlled so that the object is overexposed, and if the object is a blackish or bluish one having a relatively low reflectivity, the light emission of the strobe is controlled so that the object is under-exposed.

With this operation, the above-described defects may be solved. However, accurately guessing the reflectivity of the object and performing compensation of the exposure value can only be done by experienced and skilled photographers. It is impossible to have all the photographers do such an operation. Further, it is not preferable that a manual operation of the photographer is required for exposure. Further, if such a manual operation is required, the camera becomes unsuitable, as the recent trend is for automatic photographing.

SUMMARY OF THE INVENTION

It is therefore an object of the invention to provide a strobe control device, which enables an appropriate exposure using the strobe regardless of the difference of reflectivity of the objects.

For the above object, according to the invention, there is provided a strobe control device for a camera, which is provided with a light amount measuring system that measures amount of light emitted by a strobe and reflected by an object, a comparing system that compares the measured light amount with a reference exposure light amount, the reference exposure light amount being determined in accordance with a reference control level, the strobe being controlled to stop emitting light when the measured light amount reaches the reference exposure light amount, a colorimetry system that determines a color of the object, a reflection compensation value determining system that determines a compensation value for compensating for errors depending on a reflectivity of an object, and a compensation system that compensates for the reference control level in accordance with the reflection compensation value.

With this configuration, by adjusting the reference control level (which is referred to as a strobe control level SXVD in the description of the embodiment), which is used as a reference for determining the appropriate exposure amount when the strobe photographing is executed in accordance with the color of the object, regardless of the color of the object and therefore regardless of the reflectivity of the object, the strobe photographing can be performed with appropriate amount of strobe light.

Optionally, the colorimetry system may include a blue photometry sensor for metering a blue light component, a green photometry sensor for metering a green light component, and a red photometry sensor for metering a red light component.

In this case, the colorimetry system may include a light receiving surface divided into a plurality of light receiving areas, and color of the object may be measured in each of the areas. Further, the reflection compensation value determining system may determine the compensation value based on a colorimetry value of the object in said each of the areas.

Further optionally, the strobe control device may include a light emission circuit that drives the strobe to emit light, a detector that outputs an electrical current upon receipt of the light reflected by the object, a TTL integration circuit that integrates the output of the detector, the light emission circuit stops the light emission when an output voltage of the TTL integration circuit reaches a TTL reference voltage, the TTL reference voltage being set corresponding to the appropriate exposure amount, a reference control level being a control level for setting the TTL reference voltage.

In this case, the TTL integration circuit may further include a charging circuit that accumulates electric charges corresponding to the measured light amount and outputs a charged voltage corresponding to the accumulated electric charges, a D/A converter that generates the TTL reference voltage based on a value of the reference control level, and a comparing circuit that compares the charged voltage with the TTL reference voltage, and outputs a quench signal for stopping the light emission of the light emission circuit when the charged voltage exceeds the TTL reference voltage.

Furthermore, the charging circuit may output the charged voltage as a difference with respect to the reference voltage, and wherein the D/A converter generates the TTL reference voltage as a difference with respect to the reference voltage in accordance with the reference control level.

Still optionally, the charging circuit may include a voltage dividing circuit that divides the charged voltage. In this case, one of the charged voltage and a divided voltage which has been divided by the voltage dividing circuit may be selectively applied to the comparing circuit as the charged voltage.

Further, the strobe control device may include a normal light detecting system that performs photometry with respect to the object, a strobe photographing using the strobe control device to be performed being determined based on a measured value of the normal light detecting system.

In a particular case, the camera is a single lens reflex camera provided with a pentagonal prism, and the colorimetric system and the normal light detecting system are arranged on an eyepiece optical system side with respect to the pentagonal prism, the normal light detecting system facing an upper central portion of the pentagonal prism.

Optionally, the green photometry sensor is used as the normal light detecting system, an output of the green photometry sensor being used as the output of the normal light detecting system.

BRIEF DESCRIPTION OF THE ACCOMPANYING DRAWINGS

FIG. 1 shows a perspective view of a camera employing a photometry device according to an embodiment of the invention;

FIG. 2 schematically shows main components of the camera shown in FIG. 1;

Figure 4A:
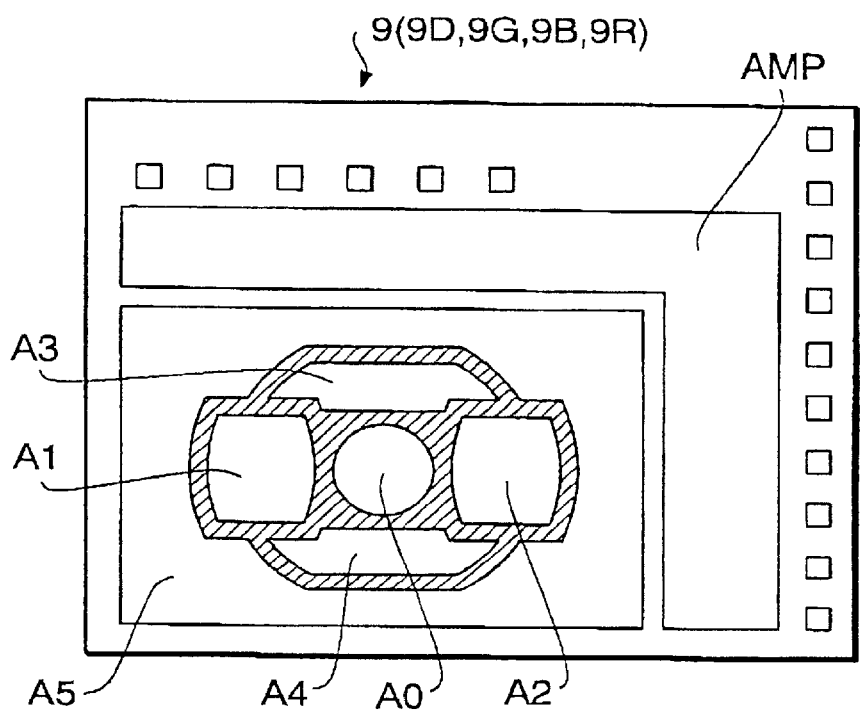
Figure 4B:
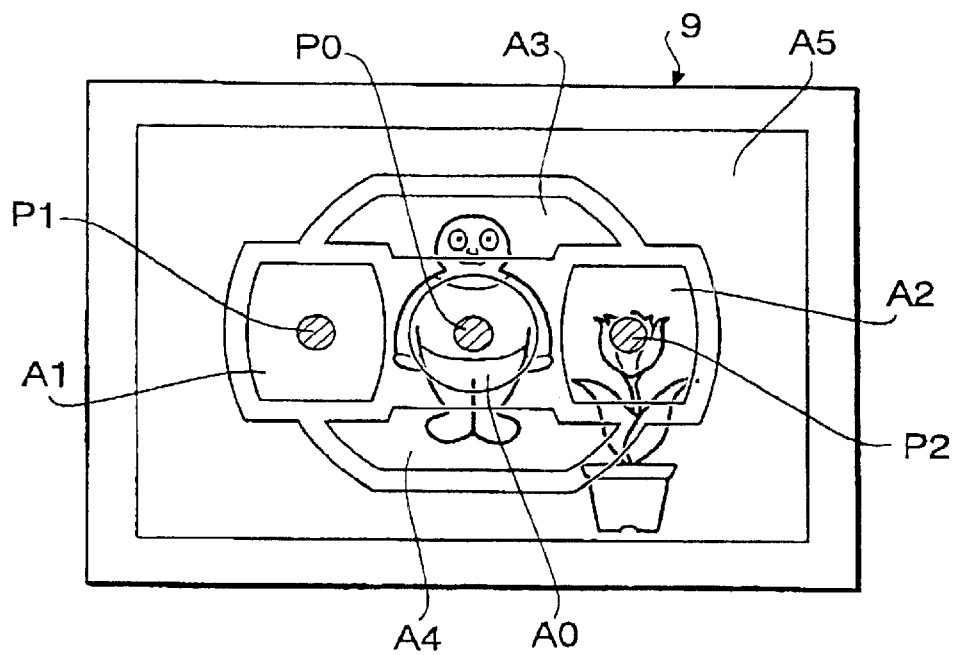
Figure 5:
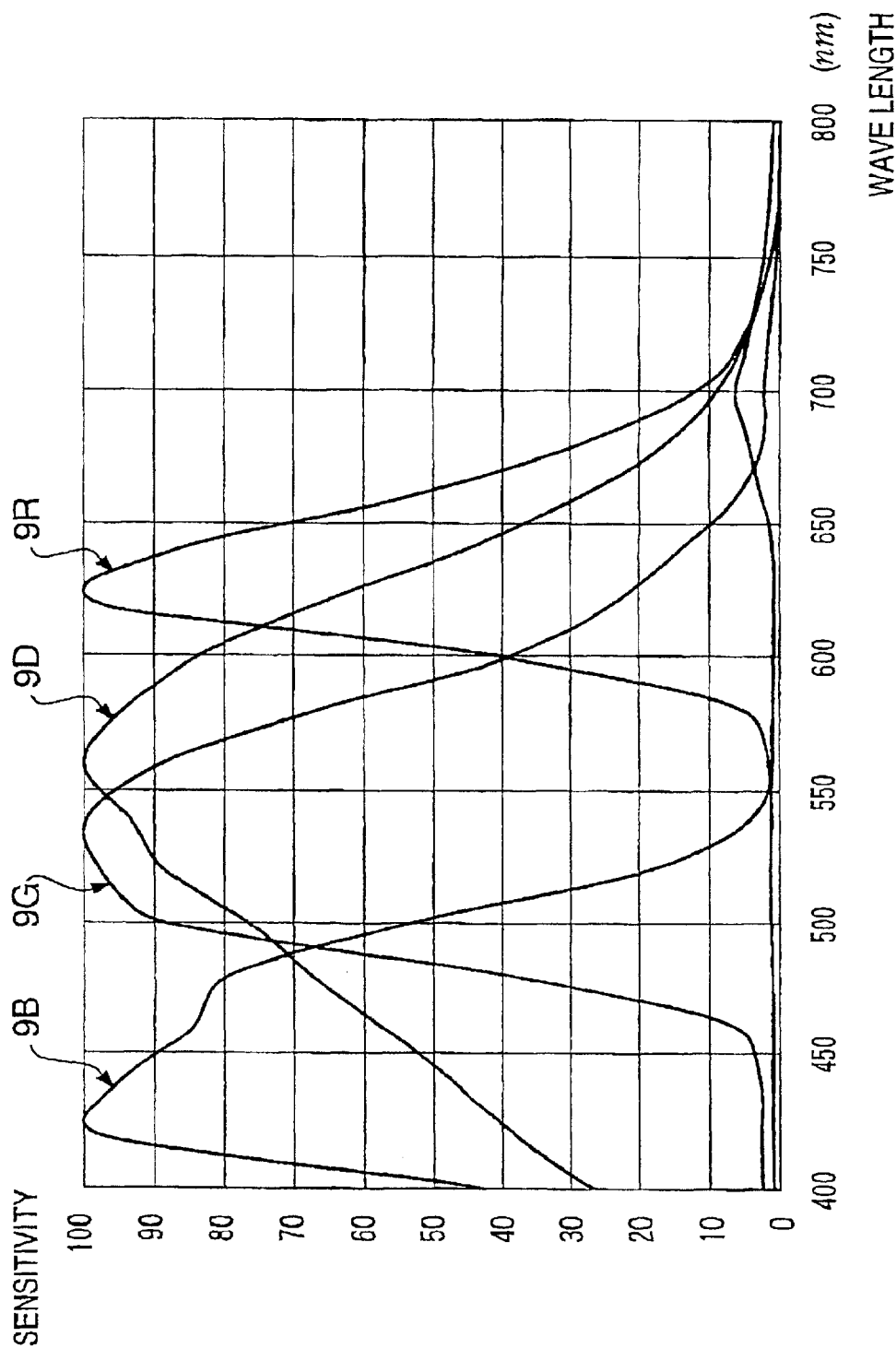
Figure 6:
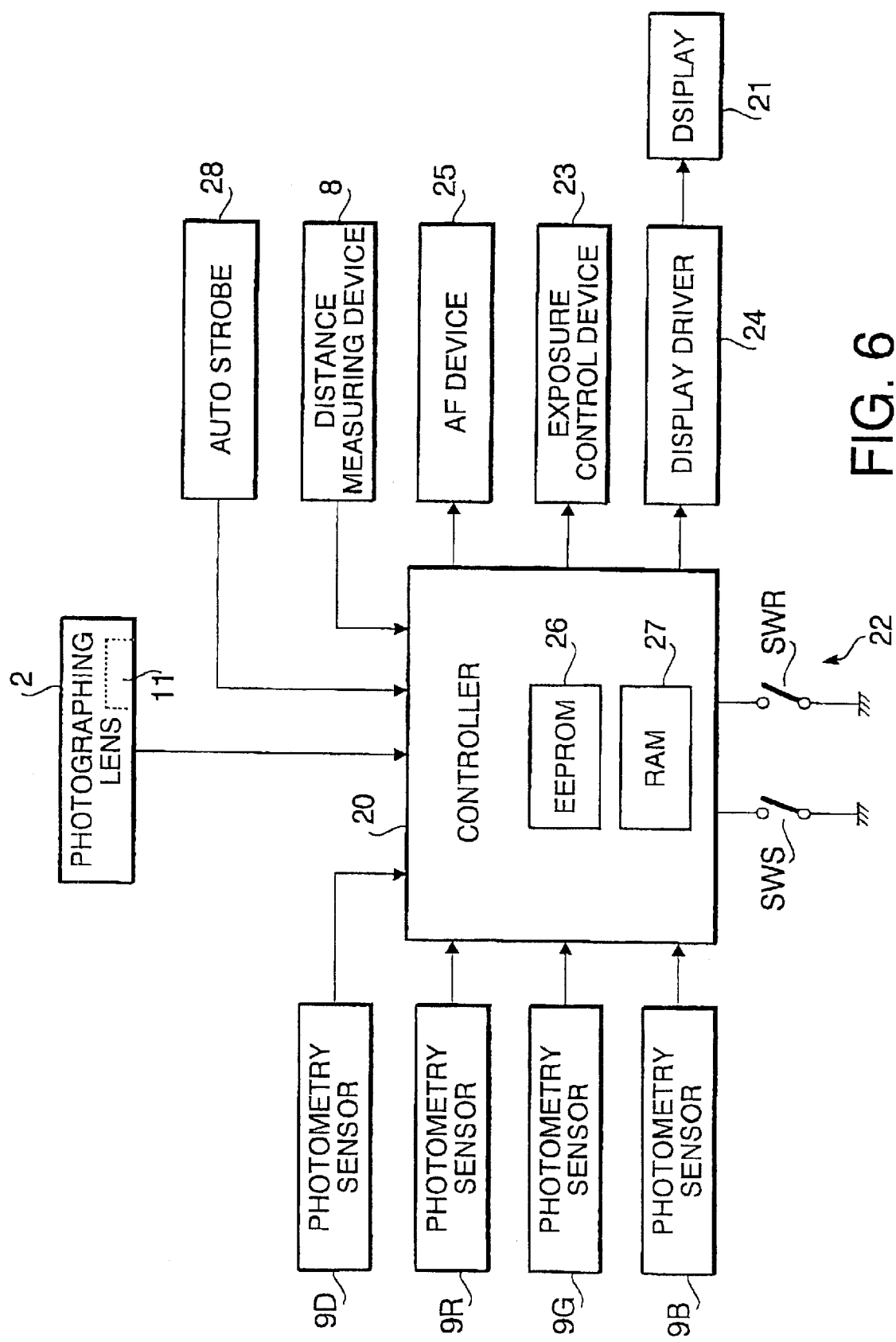
Figure 7:
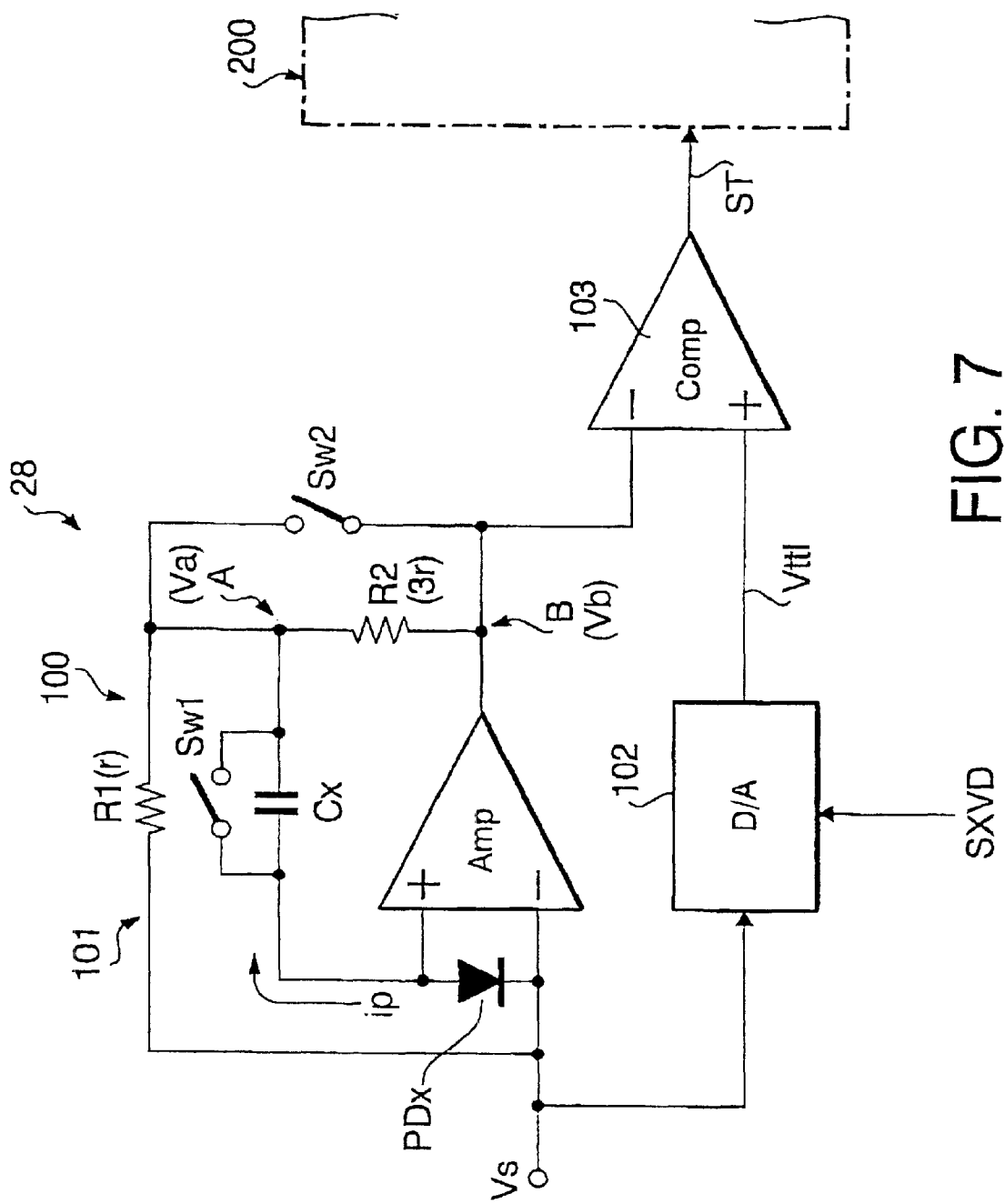
Figure 8:
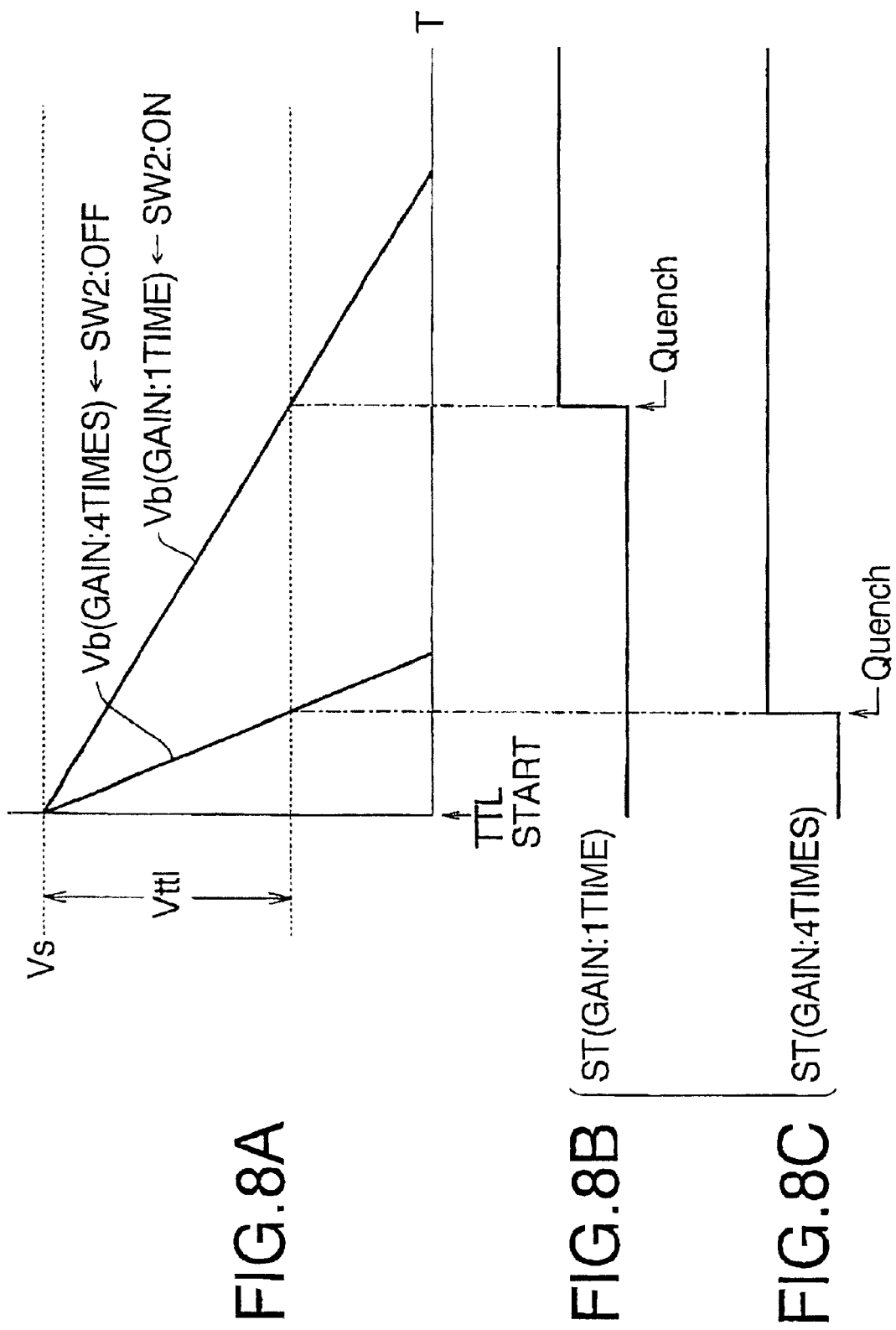
Figure 10:
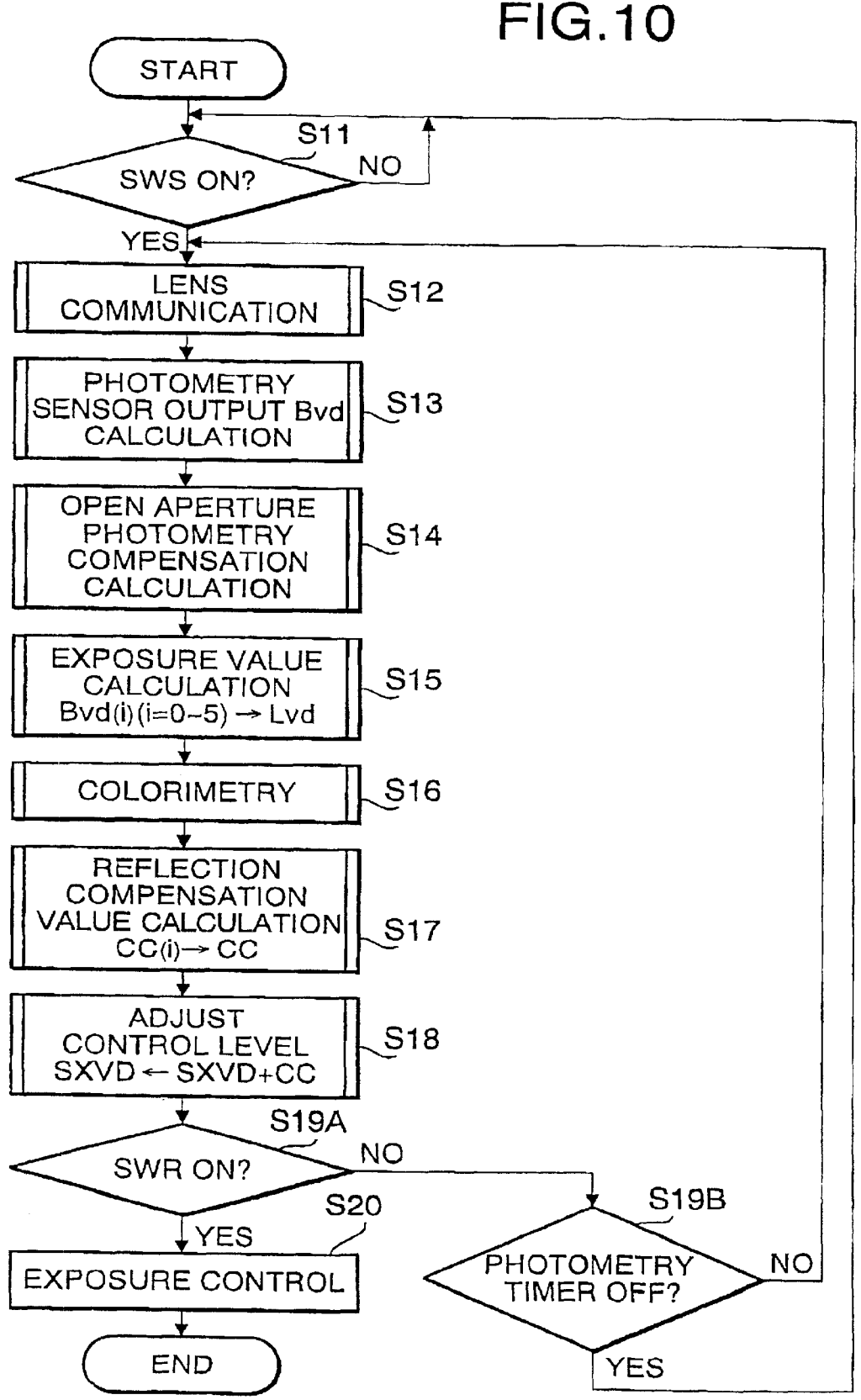
Figure 11:
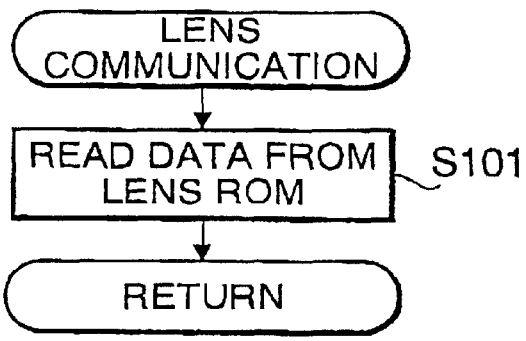
Figure 12:
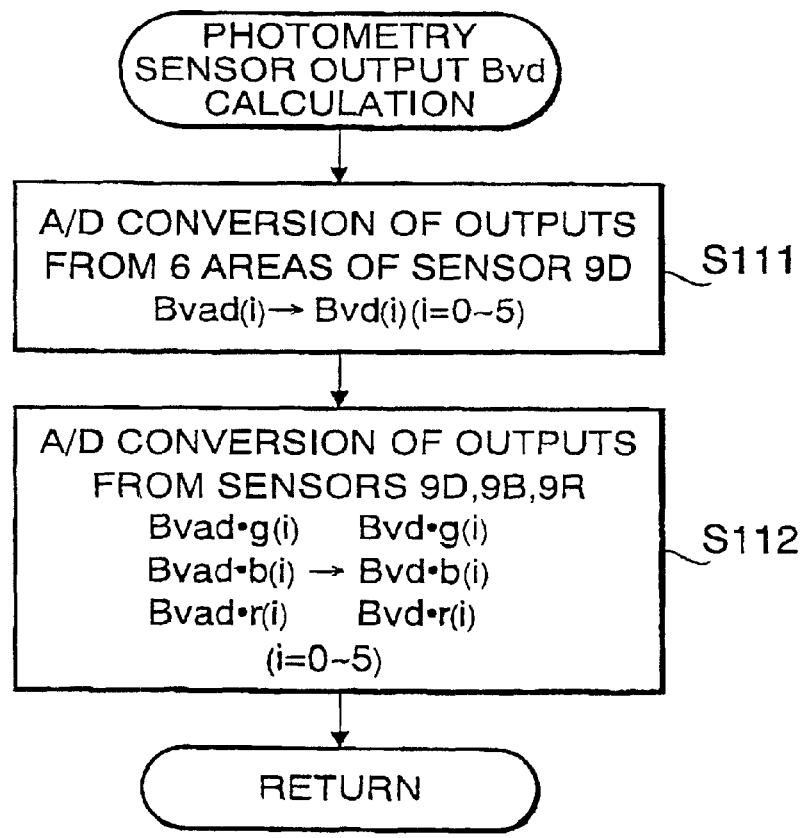
Figure 13:
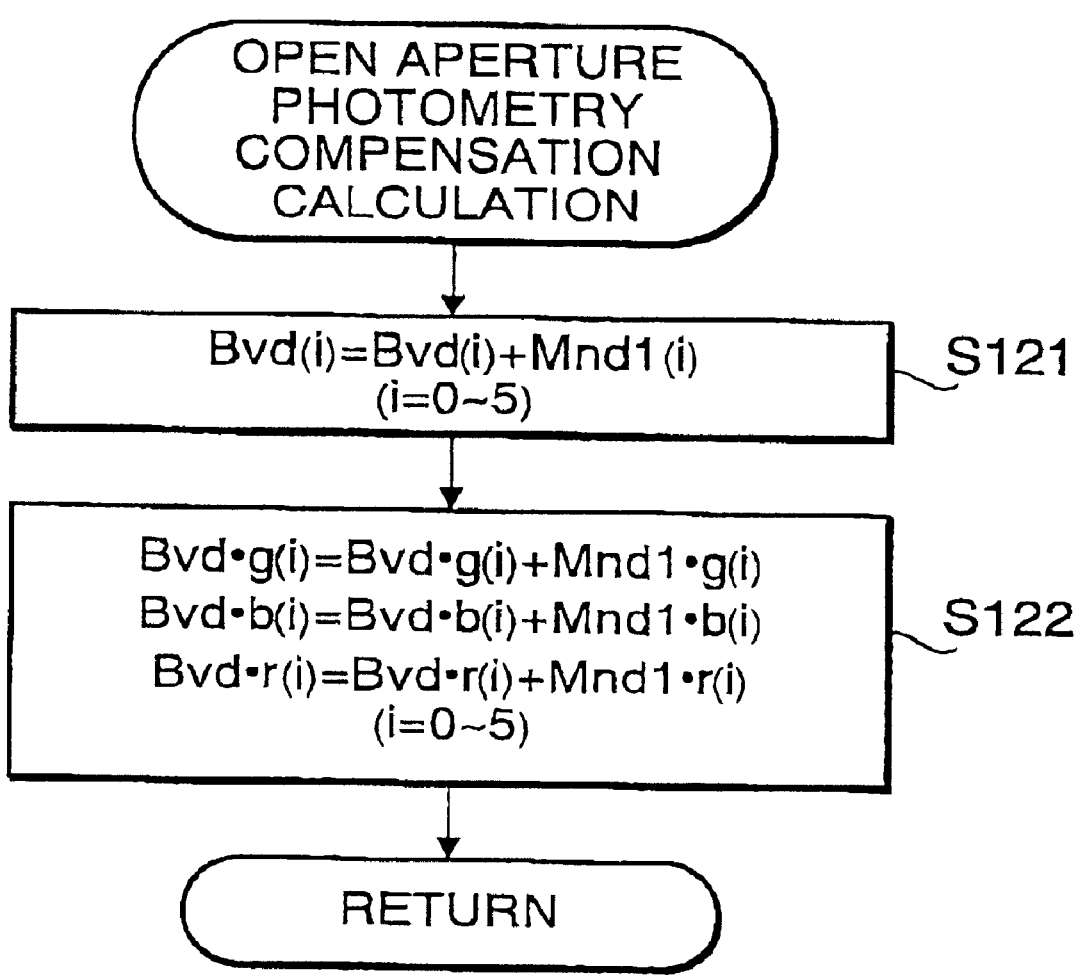
Figure 14:
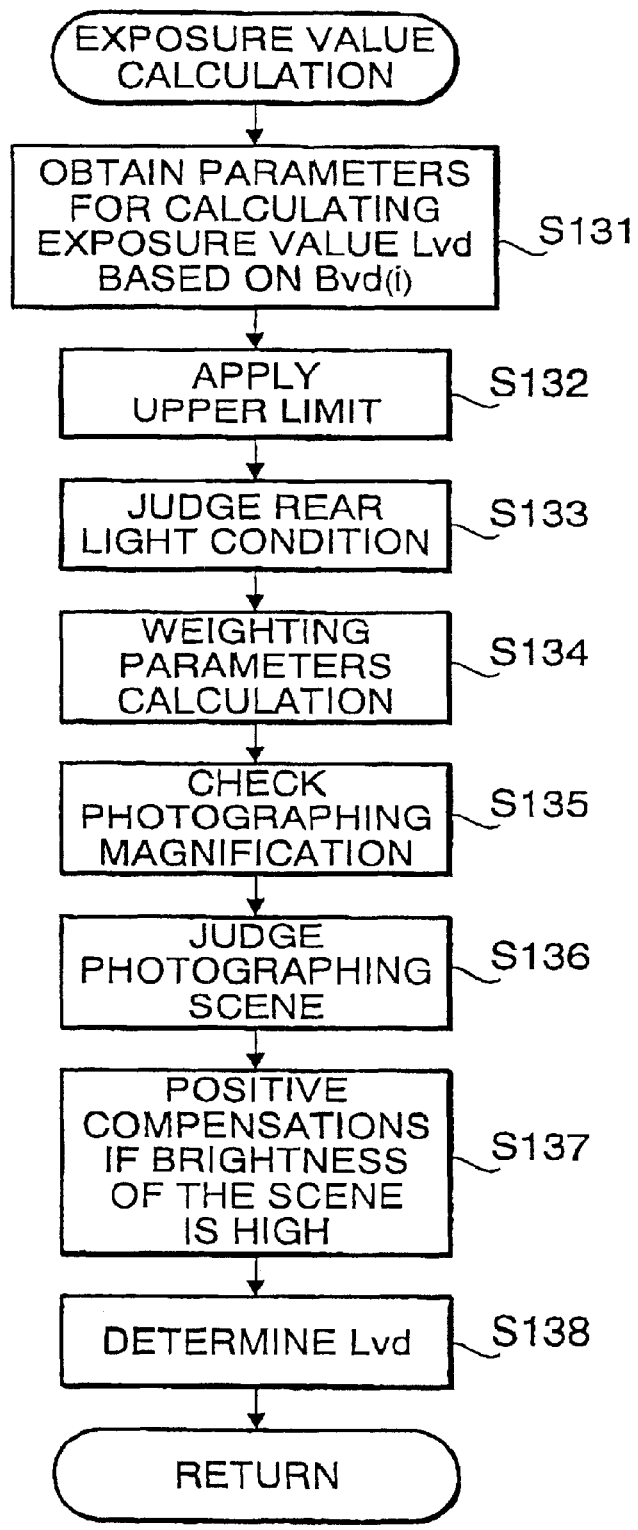
Figure 15:
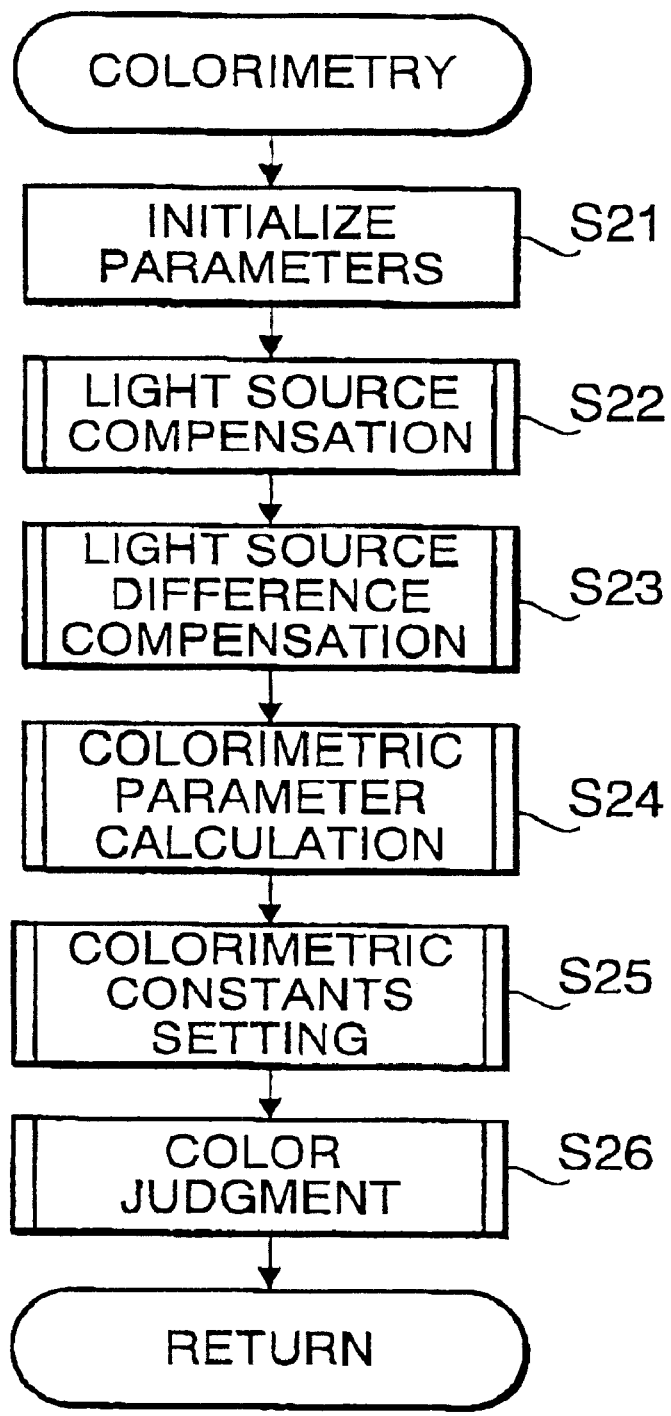
Figure 16:
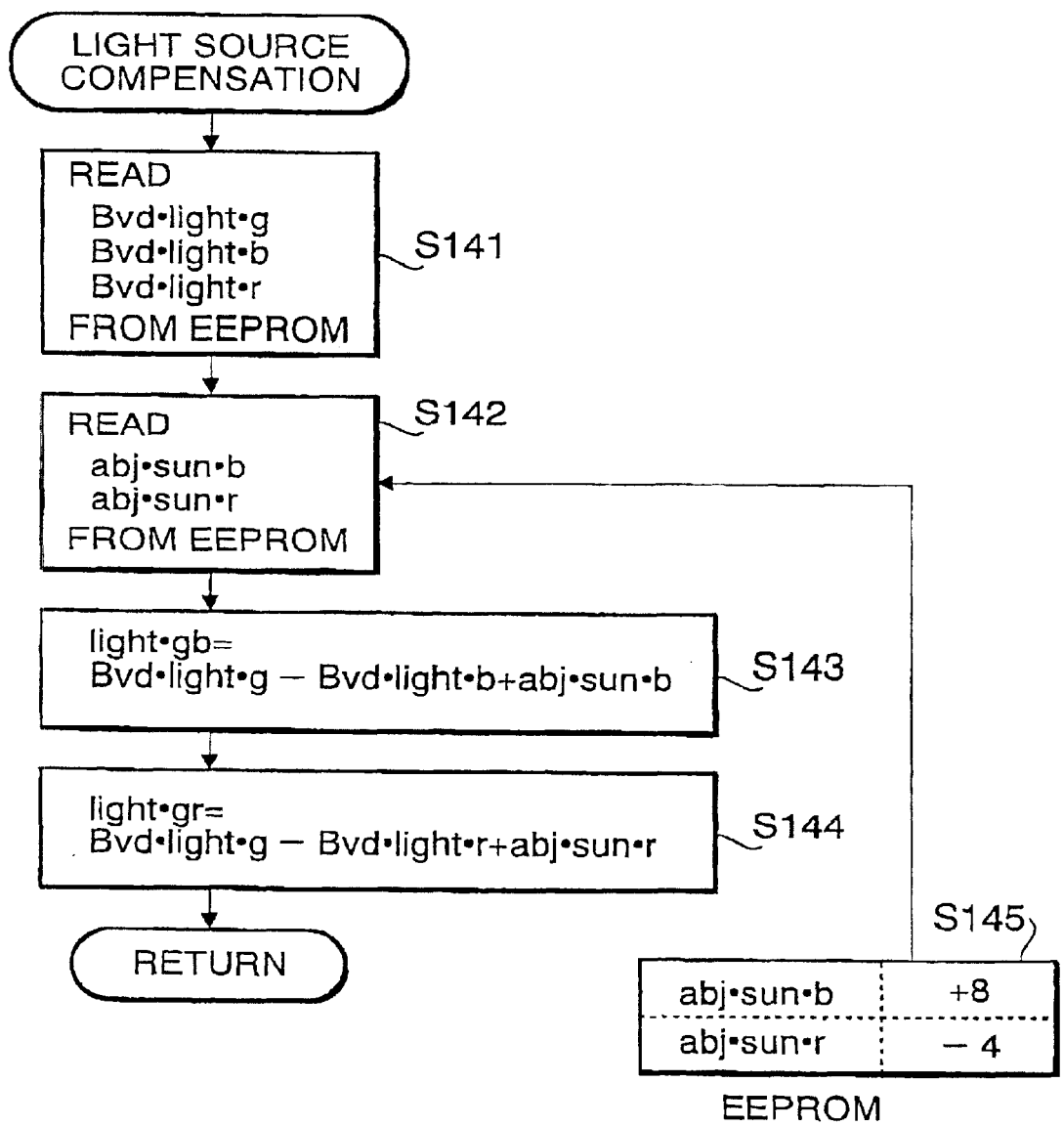
Figure 17:
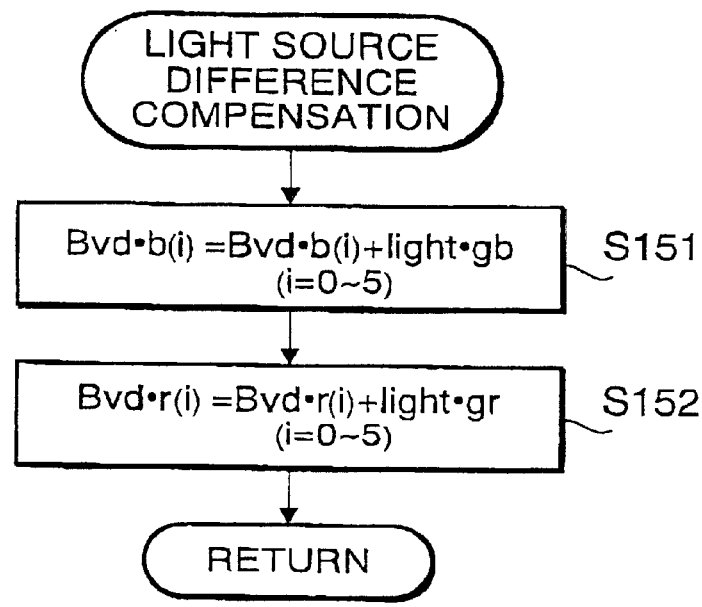
Figure 18:
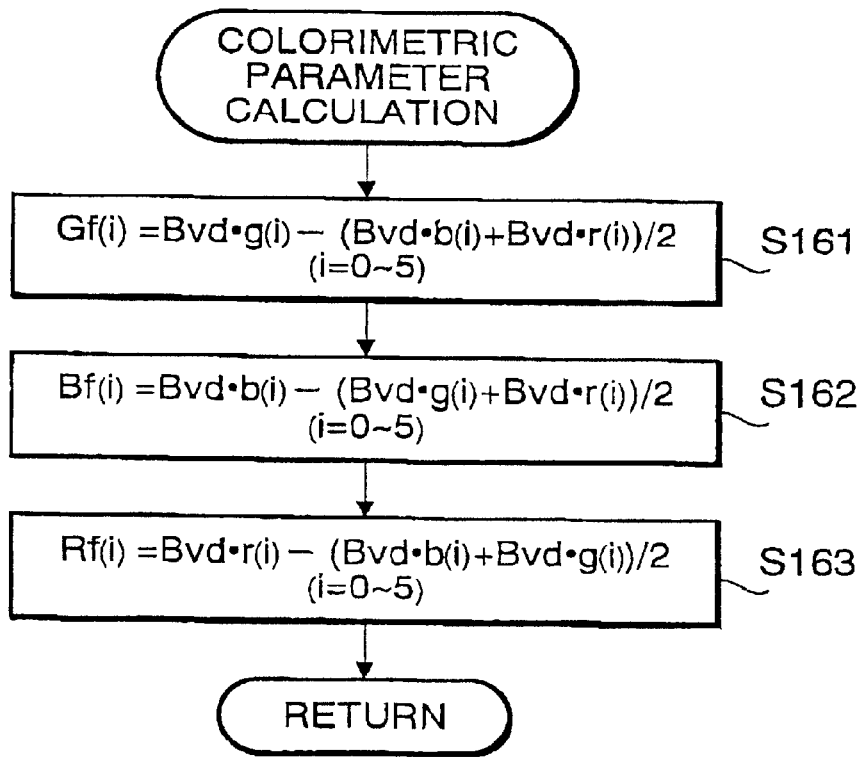
Figure 19:
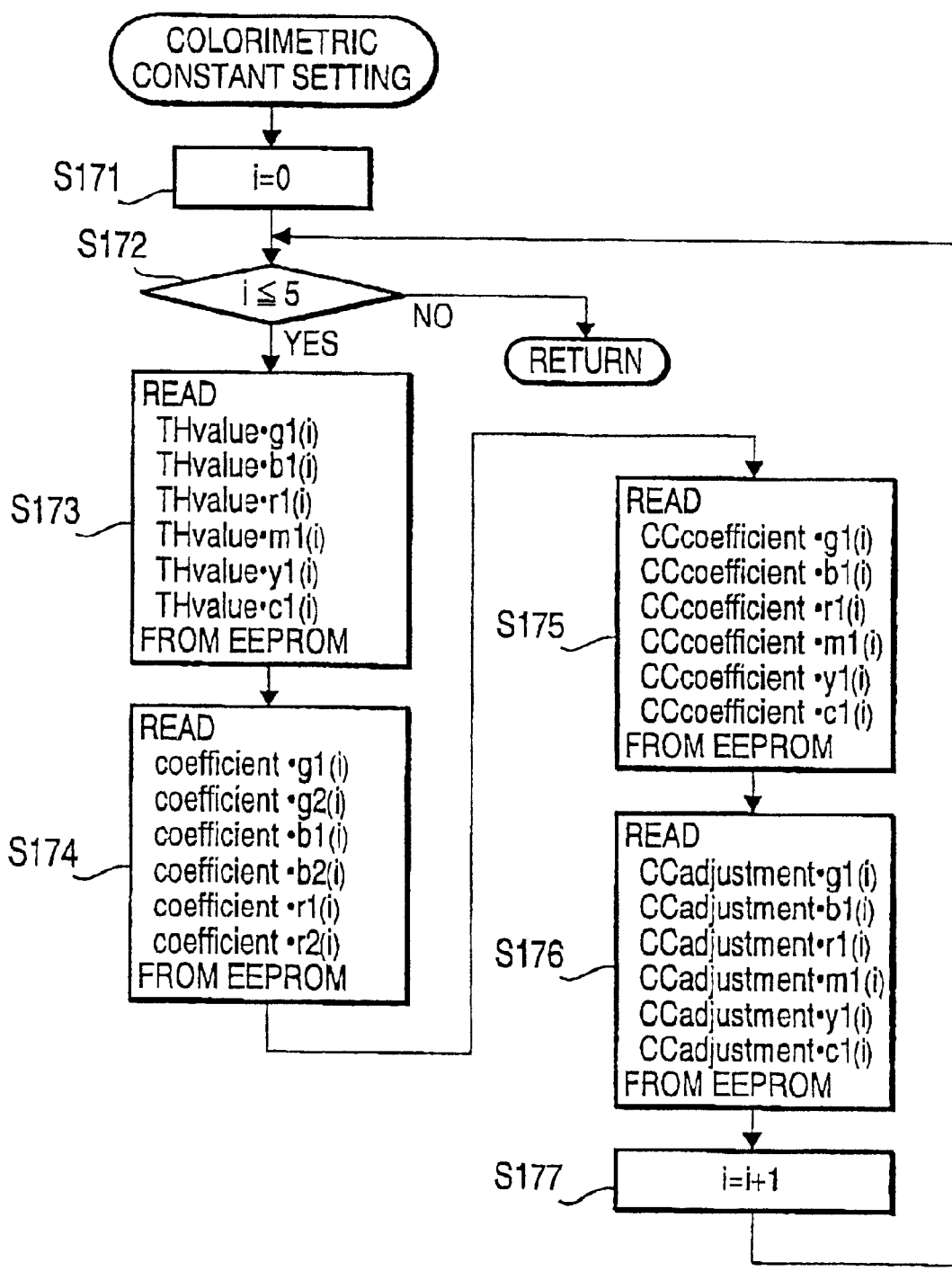
Figure 21:
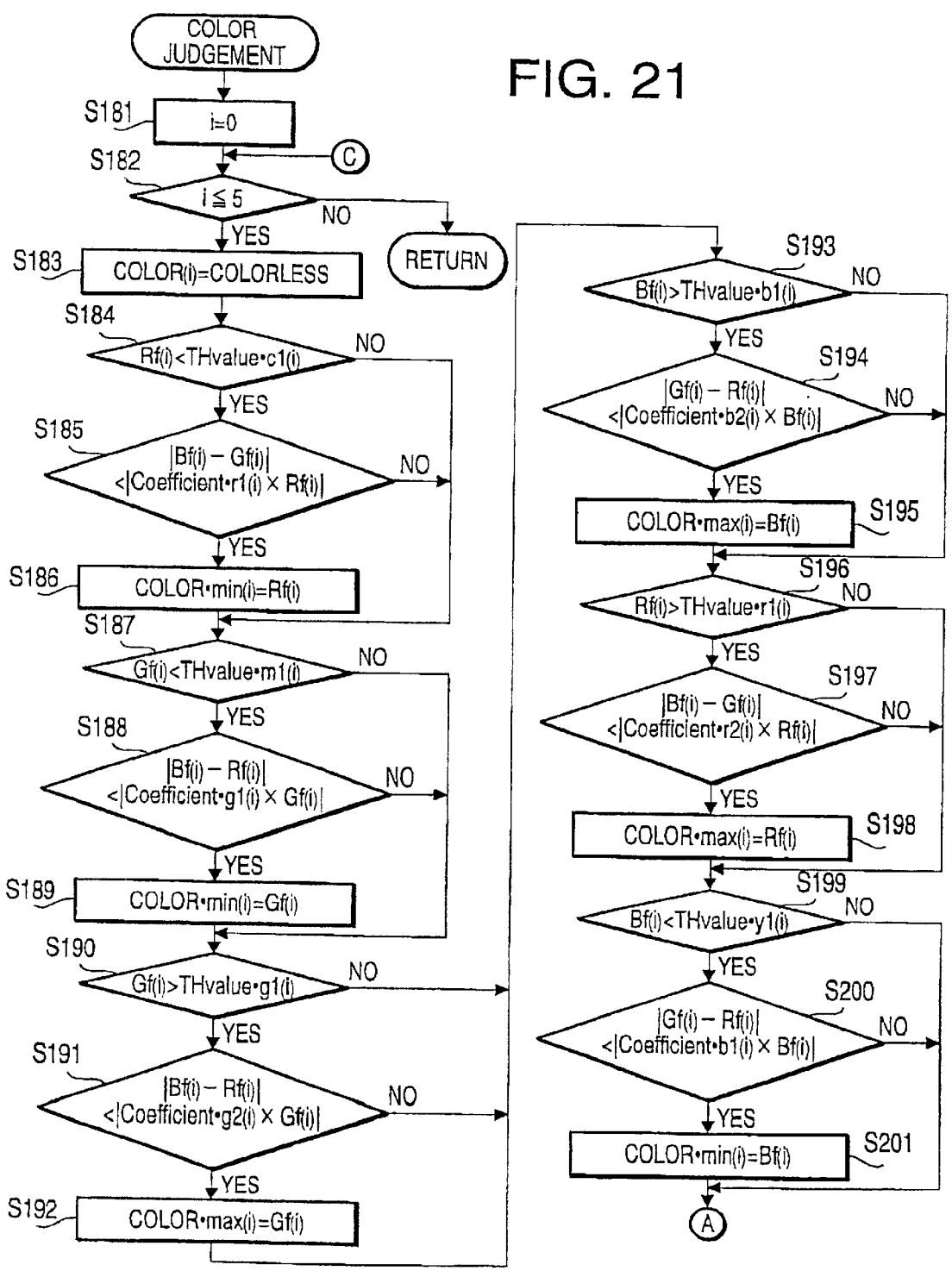
Figure 22:
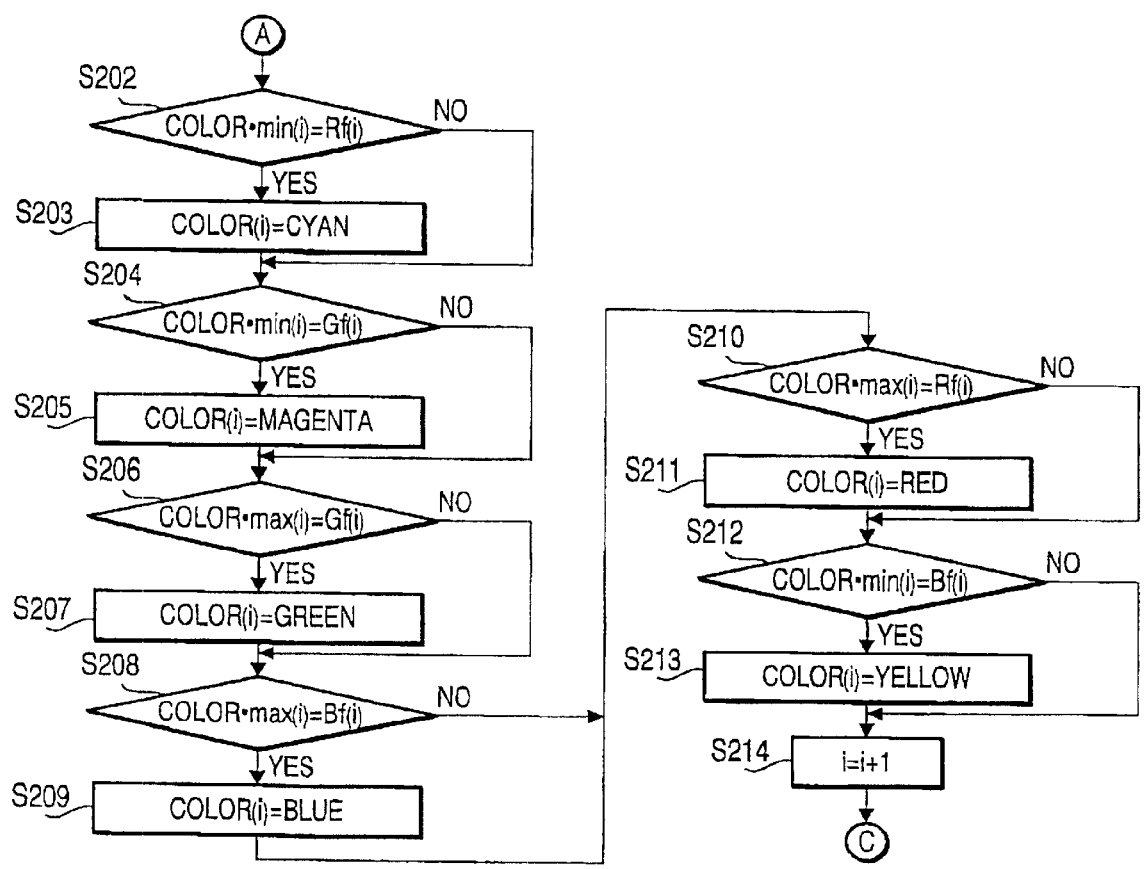
Figure 23:
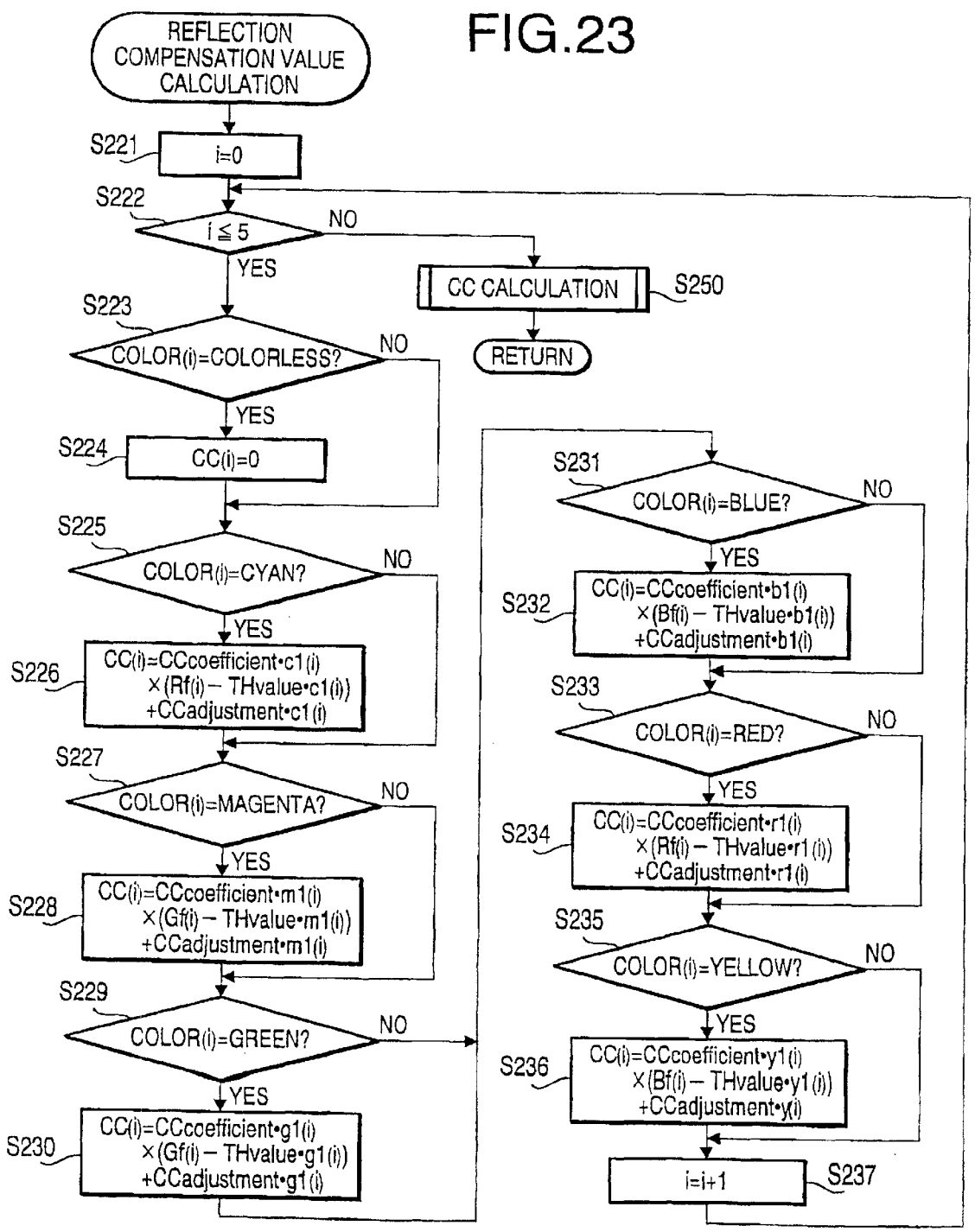
Figure 24:
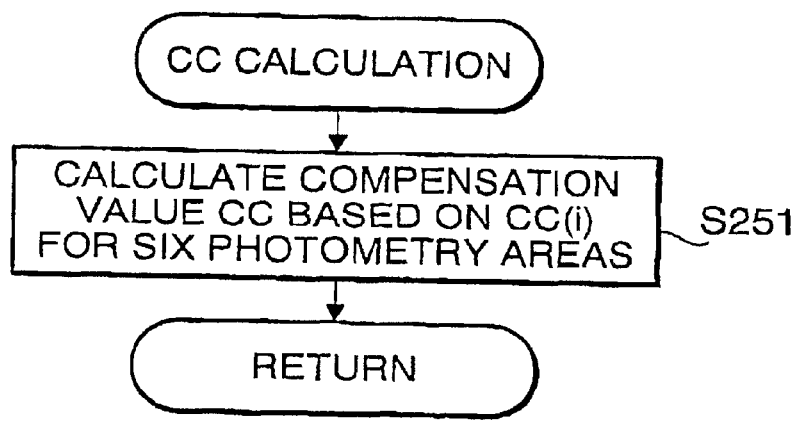
Figure 25:
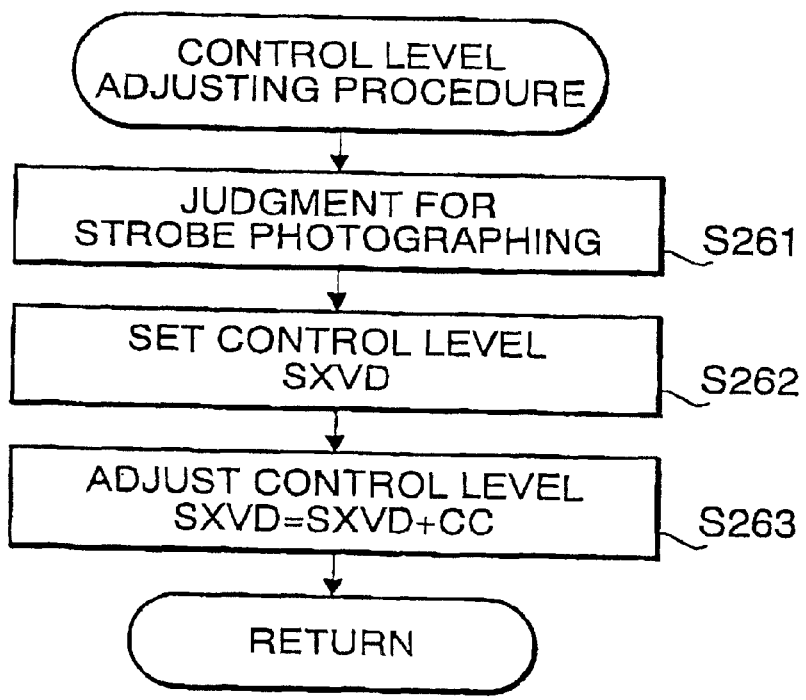

FIG. 4A schematically shows a structure of each of the photometry sensors;

FIG. 4B shows a relationship between the photometry areas and distance measuring points of each photometry sensor;

FIG. 5 shows spectral sensitivity characteristics of the green, blue and red sensors;

FIG. 6 shows a block diagram of main portions of the camera;

FIG. 7 shows a circuit diagram of the main parts of a strobe control device;

FIGS. 8A–8C show a timing chart illustrating an operation of the strobe control device;

FIG. 9 shows a table indicating a relationship between the strobe control level and the TTL reference voltage;

FIG. 10 is a flowchart illustrating a main procedure of a photometry operation according to a first embodiment;

FIG. 11 is a flowchart illustrating a "lens communication procedure";

FIG. 12 shows a flowchart illustrating a "photometry sensor Bvd calculation procedure";

FIG. 13 is a flowchart illustrating an "open aperture photometry compensation calculation procedure";

FIG. 14 is a flowchart illustrating an "exposure value calculating procedure";

FIG. 15 is a flowchart illustrating a "colorimetry procedure";

FIG. 16 is a flowchart illustrating a "light source compensation procedure";

FIG. 17 is a flowchart illustrating a "light source difference compensation procedure";

FIG. 18 is a flowchart illustrating a "calorimetric parameter calculation procedure";

FIG. 19 is a flowchart illustrating a "colorimetric constant setting procedure";

FIG. 20 shows an example of constants read from an EEPROM;

FIGS. 21 and 22 show a flowchart illustrating a "color judgment procedure";

FIG. 23 is a flowchart illustrating an example of an "area reflection compensation value calculating procedure";

FIG. 24 is a flowchart illustrating a reflection compensation value calculating procedure according to the first embodiment; and FIG. 25 is a flowchart illustrating a control level adjusting procedure.

DESCRIPTION OF THE EMBODIMENTS

Hereinafter, referring to the accompanying drawings, a strobe light controlling device according to an embodiment of the present invention will be described.

Figure 1:
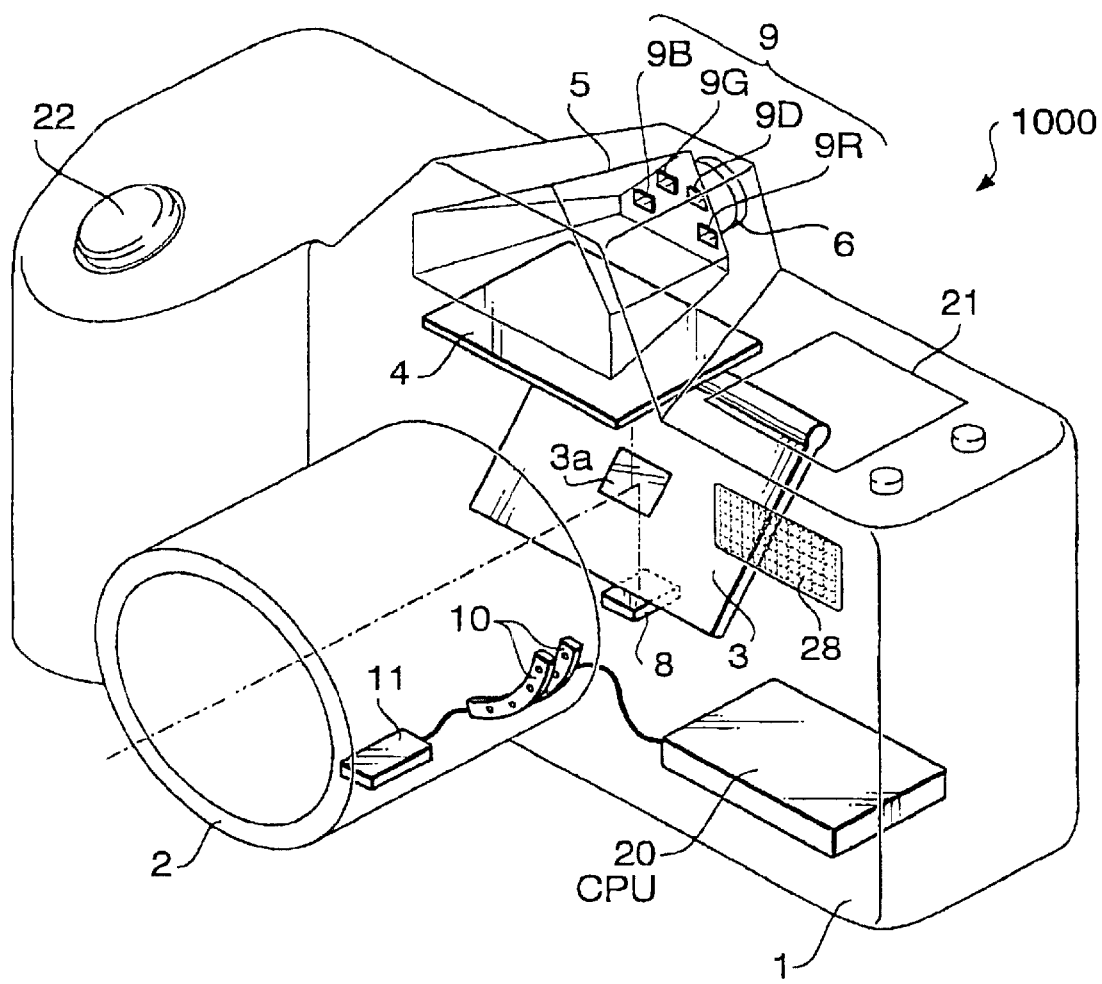
Figure 2:
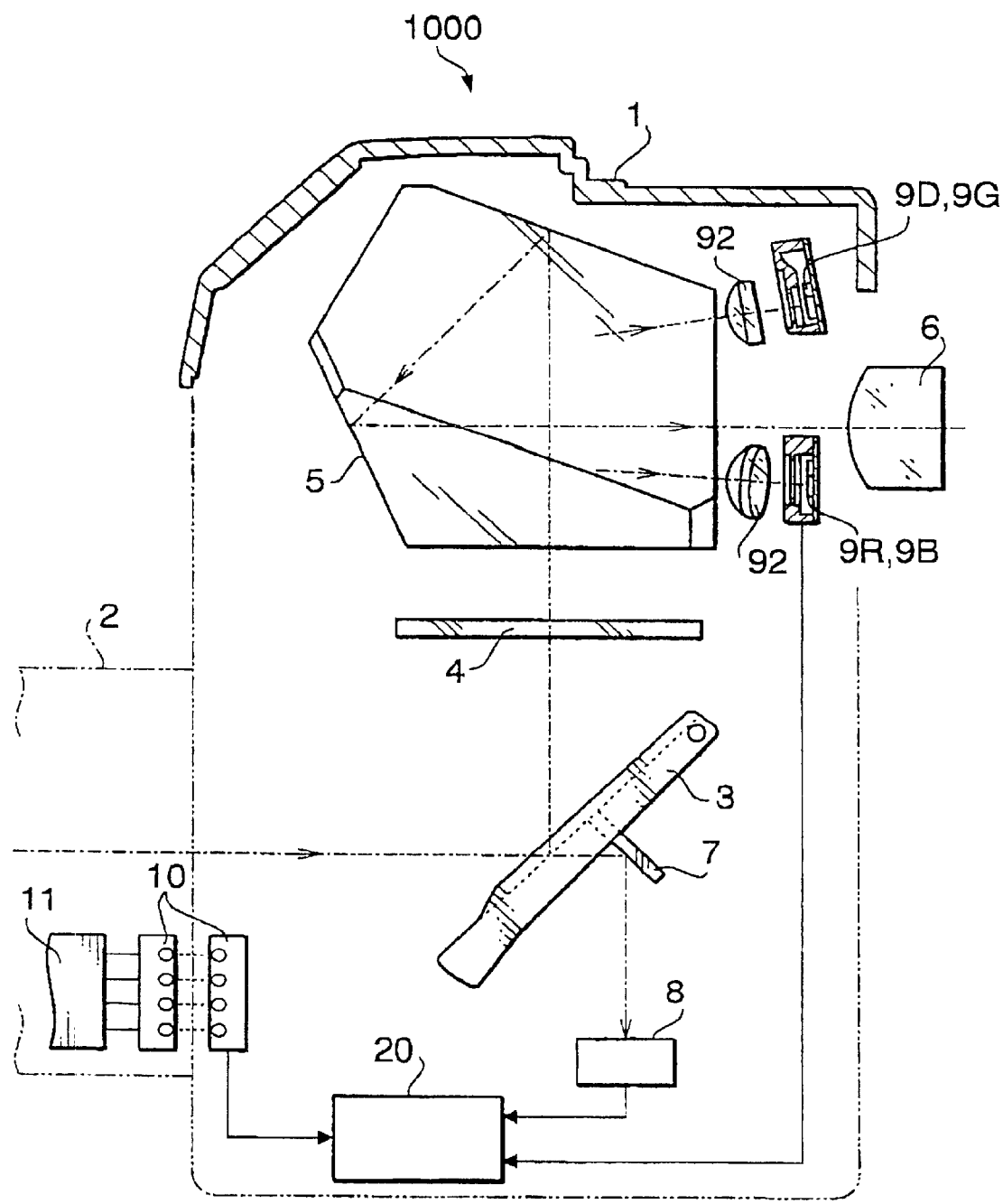

FIG. 1 shows a perspective view of an SLR (single lens reflex) camera 1000 employing a strobe light controlling device according to an embodiment of the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of a front surface of the camera body 1, an auto strobe device 28 is provided. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a multi-point distance measuring device 8. The distance measuring device 8 is used for a multi-AF (Automatic focusing) control. Namely, using the multi-point distance measuring device 8, a plurality of distance measuring data are obtained at a plurality of distance measuring points and the distance measuring data corresponding to the plurality of distance measuring points is selected. Then, in accordance with the selected distance measuring data, AF control is performed. On an eyepiece side of the pentagonal prism 5, four photometry sensors 9 (9D, 9R, 9G and 9B) are provided, each of which functions as a photometry element and receives light passed through the photographing lens 2. The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 are provided. Furthermore, inside the camera body 1, various mechanisms such as a film winding mechanism are provided. However, such mechanisms are conventionally employed in a camera, and description thereof will be omitted for the sake of the simplicity.

Figure 3A:
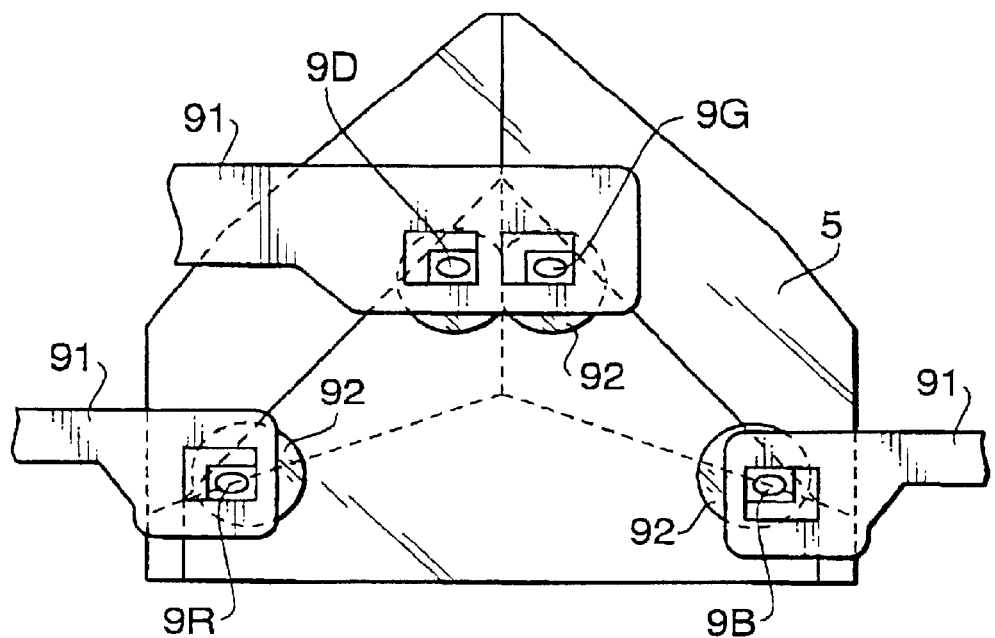
FIG. 3A shows an arrangement of photometry sensors.

FIG. 3A shows a rear view of the pentagonal prism 5 and the photometry sensors 9. As shown in FIG. 3A, the four photometry sensors 9 include sensors 9D and 9G provided at an upper central portion on the eyepiece side of the pentagonal prism 5, and sensors 9B and 9R provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, a collective lens 92 is provided in front of each of the sensors 9D, 9G, 9B and 9R to form an object image thereon.

FIG. 4A schematically shows a structure of each of the sensors 9D, 9G, 9B and 9R. As shown in FIG. 4A, each sensor 9 (9D, 9G, 9B or 9R) is constructed as a planar structure photometry IC chip that is configured such that a light receiving section and an amplifier AMP are integrally formed. The light receiving section includes six photometry areas, i.e. a central area A0, a left area A1, a right area A2, an upper area A3, a lower area A4, and a peripheral area A5. FIG. 4B shows a relationship among the photometry areas A0–A5, portions of an object, and distance measuring points P0–P2. The photometry areas A0–A5 of each sensor receive the light from respective portions of an object as indicated in FIG. 4B. The photometry sensor 9G is provided with a green filter on its light receiving surface, and receives a green component of light, the photometry sensor 9B is provided with a blue filter on its light receiving surface, and receives a blue component of light, and the photometry sensor 9R is provided with a red filter on its light receiving surface, and receives a red component of light. In this embodiment, the three sensors 9G, 9B and 9R are used as colorimetry elements. Spectral sensitivity characteristics of the sensors 9G, 9B and 9R respectively provided with the green, blue and red filters are indicated in FIG. 5. The spectral sensitivity of the sensors 9G, 9B and 9R respectively provided with the green, blue, and red filters have peaks, in sensitivity, at approximately 540 nm, 420 nm, and 620 nm, respectively. The remaining sensor 9D is not provided with a color filter, but a luminosity compensating filter is provided. The spectral sensitivity characteristic of the sensor 9D provided with the luminosity compensating filter has its peak within a wavelength range of 500–600 nm, which is close to the visual sensitivity characteristic. The sensor 9D is used as a normal light detecting sensor.

FIG. 6 shows a block diagram of main portions of the camera 1000. The four sensors 9D, 9G, 9B and 9R output values indicative of quantity of received light components (i.e., normal light and green, blue and red light components) to the controller 20, respectively. Further, the output (i.e., a distance value) of the distance measuring device 8 is input to the controller 20, which controls the AF device 25 to perform the automatic focusing operation.

Furthermore, the controller 20 is connected with a photometry switch SWS and a shutter-release switch SWR. The photometry switch SWS is ON when the release button 22 is depressed halfway. The shutter-release switch SWR is ON when the shutter button is fully depressed. When the shutter button is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 that stores various values necessary for the photometry calculation (which will be described in detail later), and a RAM 27 for temporarily storing various pieces of data.

It should be noted that the multi-point distance measuring device 8 detects distances at a plurality of points. According to the embodiment, the multi-point distance measuring device detects distances at points P0, P1 and P2 inside the areas A0, A1 and A2, respectively (see FIG. 4B). When the controller 20 performs the AF procedure described above, data representing the distances at point P0, P1 and P2 are stored in the RAM 27, and then, based on the data corresponding to the point(s) P0, P1 and/or P2 satisfying a certain condition, the photographing lens 2 is moved for focusing.

For example, the closest one of the points P0, P1 and P2 is selected, or an intermediate one of the points P0, P1 and P2 is selected.

Furthermore, an auto strobe device 28 is connected to the controller 20. FIG. 7 shows an exemplary circuit of an auto strobe device 28. The auto strobe device 28 includes a TTL integration circuit 100, and a light emission circuit 200. The auto strobe circuit 28 starts emission of strobe light synchronously of a shutter operation. Then the TTL integration circuit 100 detects the strobe light reflected by an object, and outputs a quench signal ST when the integrated light amount reaches a predetermined amount. The quench signal ST is input to the light emission circuit 200, which stops emitting the strobe light in response to the receipt of the quench signal ST. Since the TTL integration circuit 100 and the light emission circuit 200 are well-know circuits, it will be described briefly below.

The TTL integration circuit 100 includes:
- a photometry element PDx;
- a charging circuit 101 including an amplifier Amp, resistors R1 and R2, and first and second switches SW1 and SW2;
- a D/A (digital-to-analog) converter 102; and
- a comparator 103.

The photometry element PDx receives the strobe light reflected by the object when the shutter is opened. The electrical charges generated by the photometry element PDx is accumulated in a condenser Cx, and a voltage across the condenser Cx is output by the charging circuit as a charged voltage. The D/A converter 102 outputs a TTL reference voltage Vtt1, which is a difference voltage with respect to a reference voltage Vs, in accordance with a strobe control level SXVD, which is externally input to the D/A converter 102. The comparator 103 outputs the quench signal ST when the charged voltage has reached the TTL reference voltage Vtt1.

The first switch SW1 is in ON state before the shutter release, and is turned OFF simultaneously with the shutter release. The second switch SW2 switches the gain of the TTL integration circuit 100 in accordance with, for example, a film sensitivity. For example, the second switch SW2 is turned OFF when a high-speed film is used. The D/A converter generates the TTL reference voltage Vtt1 corresponding to the strobe control level SXVD, for example, by selecting, in accordance with a D/A step value (digital value) determined based on the strobe control level SXVD, one of a plurality of voltages which are obtained by dividing the reference voltage Vs using a plurality of resistors.

In accordance with the above configuration, when the shutter button is fully depressed and the shutter opens, the light emission of the strobe light emission circuit 200 starts so that the object is illuminated by the strobe light, and the film is exposed to light reflected by the object. Simultaneously with the light emission, the first switch SW1 of the TTL integration circuit 100 is turned OFF. Thus, in the charging circuit 101, light reflected by the object is received by the photometry element PDx, and the electrical charges are accumulated in the condenser Cx in accordance with the light amount received by the photometry element PDx. The charge Q of the condenser Cx is represented by equation (1).

$$Q = C \times V = ip \times T \tag{1}$$

where, C represents capacity of the condenser Cx, ip represent electrical current output by the photometry element PDx, T represent an accumulated time period, and V represents a voltage across the condenser Cx.

The voltage V can be expressed by equation (2).

$$V=(ip \times T)/C \quad (2)$$

Thus, a voltage Va at point A is represented as:

$$Va=Vs-V=Vs-(ip \times T)/C \quad (3)$$

A voltage Vb at point B can be switched by the ON/OFF state of the second switch SW2. If the second switch SW2 is in ON state, $$Vb=Va \quad (4)$$

while, if the second switch SW2 is in OFF state, since the resistances of the resistor R1 and R2 are r and 3r, respectively, $$Vb=Vs-4 \times V=Vs-4 \times (ip \times T)/C \quad (5).$$

Thus, voltage Vb is four times as large as voltage Va. Then, voltage Vb at point B is applied to an inverted input terminal of the comparator 103.

In the D/A converter 102, based on the D/A step value which is determined, with reference to the ON/OFF state of the second switch SW2, by the strobe control level SXVD, the reference voltage Vs is divided and the TTL reference voltage Vtt1 is generated, which is applied to the non-inverted input terminal of the comparator 103. In other words, the D/A step value which is a digital value corresponding to the strobe control level SXVD is D/A converted and the TTL reference voltage Vtt1 is generate. If the voltage Vb becomes greater than the TTL reference voltage Vtt1, the output of the comparator 103 is inversed, and the quench signal ST is output. The light emission circuit 200 stops emitting the strobe light in response to the quench signal ST. Therefore, when the photometry element PDx has received a predetermined amount of light, the strobe light emission is terminated, and thus, a so-called auto strobe operation is performed.

FIGS. 8A–8C show a timing chart illustrating the auto strobe operation. In FIG. 8A, a vertical axis represents voltage Vb (i.e., the voltage applied to the inverted input terminal of the comparator 103), and a horizontal axis represents a time period T. Voltage Vb, which represents a difference with respect to the reference voltage Vs increases as time elapses after the photometry using the photometry element PDx started. When the voltage Vb reaches the TTL reference voltage Vtt1, the quench signal ST is output. If the second switch SW2 is in OFF state at this stage, the inclination of voltage Vb in FIG. 8A is four times as large as that when the second switch SW2 is in ON state. Thus, the gain of the TTL integration circuit 100 when the quench signal ST is output is adjusted accordingly. This characteristic feature can be used such that, for example, the second switch SW2 is OFF when a high-speed film is used. Then, the quench signal ST can be output earlier than a case where a low-speed film is used.

Further, in the D/A converter 102, by D/A converting the D/A step value, which is determined based on the strobe control level SXVD, the TTL reference voltage Vtt1 can be varied. That is, in FIG. 8A, the TTL reference voltage Vtt1 can be changed in a vertical-axis direction. With this configuration, the output timing of the quench signal ST can be controlled so that a timing of terminating the strobe light emission by the light emission circuit 200 is controlled and thereby the exposure light amount with the strobe light can be controlled.

FIG. 9 is a table showing a relationship between the strobe control levels SXVD and the TTL reference voltages Vtt1.

As shown in FIG. 9, by setting the strobe control level SXVD in accordance with the sensitivity of the film, the D/A steps in the D/A converter 102 are determined in accordance with the strobe control level SXVD, and thus the TTL reference voltage Vtt1 is determined. Thus, an appropriate exposure control using the strobe light can be performed corresponding to the difference of the film sensitivity. By combining the control using the strobe control level SXVD and the ON/OFF state of the second switch SW2, an exposure control for films of a wide sensitivity range can be performed. According to the embodiment, by employing the control of the strobe light using the strobe control level SXVD, for objects having various reflectivity, photographing can be performed with appropriate strobe light by varying the strobe control level SXVD in accordance with the reflectivity of respective objects.

Operation of the Strobe Light Controlling Device

An operation of the strobe light controlling device according to the embodiment will be described hereinafter.

FIG. 10 is a flowchart illustrating a main procedure of a photographing operation including a strobe light controlling procedure.

When the release button 22 is depressed halfway and the photometry switch SWS is ON (S11: YES), a "lens communication procedure" is performed (S12) so that the controller 20 receives data intrinsic to the photographing lens 2 currently mounted onto the camera body 1. Specifically, the data intrinsic to the photographing lens 2 includes an open f-number, a focal length of the photographing lens 2 and the like, which may affect the photometry calculation, intrinsic to the photographing lens 2. The data is transmitted from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, quick return mirror 3, and the pentagonal prism 5. Then, the analog values are converted into digital brightness values Bvd which can be used in the operation at S20 executed by the controller 20. It should be note that photometry is performed for each of the areas A0–A5, and then, photometry values Bvd(i) (i=0, 1, . . . 5) are obtained. Then, using the brightness values Bvd(i) obtained at S13 and the lens data intrinsic to the photographing lens 2 retrieved at S12, an "open aperture photometry compensation calculation procedure" is executed (S14) to compensate for errors depending on individual photographing lenses.

At S15, an "exposure value calculation procedure" is executed. In this procedure, based on the brightness values Bvd(i), which are compensated for at S14, obtained in accordance with the outputs of the photometry sensors 9R, 9G and 9B, an exposure value is calculated.

At S16, based on the brightness value Bvd(i) obtained by each of the sensors 9R, 9B and 9G for the RGB (Red, Green and Blue) color components, a "colorimetry procedure" is executed to determine the color of the object, and a reflection compensation value CC is calculated based on the determined color of the object. Then, based on the determined color, a reflectivity compensation value calculating procedure is executed (S17), to calculate reflectivity compensation values CC(i) (i=0, 1, . . . 5). Then, based on the thus obtained reflectivity compensation values CC(i), a final reflectivity compensation value CC for an entire object is calculated. In S18, a control level adjusting procedure is executed, where the strobe control level SXVD for determining the TTL reference voltage Vtt1 is adjusted in accordance with the final reflectivity compensation value CC. This is done by the following calculation.

$$SXVD = SXVD + CC$$

Then, at S19A, if the shutter-release switch SWR is ON (S19A: YES), it the photometry value for the object is lower than a predetermined threshold, and the strobe light is to be used as an auxiliary light for illuminating the object, the exposure control device 23 controls the exposure operation in accordance with the exposure value obtained at S18, with controlling the auto strobe device 28 based on the adjusted control level to execute a photographing operation (S20). If the shutter-release switch SWR is OFF (S19A: NO), controls goes to S19B, where It is detected whether a photometry timer is OFF.

If the photometry timer is ON (i.e., if a predetermined period has not elapsed) (S19B: NO), control proceeds to S12, and the foregoing procedures are repeated. If the photometry timer is OFF (i.e., if the predetermined period has elapsed)(S19B: YES), control proceeds to S11.

FIG. 11 is a flowchart illustrating the "lens communication procedure", which is called at S12 of the main procedure shown in FIG. 10.

In the lens communication procedure, the controller 20 accesses the lens ROM 11 through the electrical contacts 10, and reads the data intrinsic to the photographing lens 2 stored in the lens ROM 11 (S101). The data is stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads at least the focal length, the exit pupil position, the open f-number and the aperture efficiency, and stores the data in the RAM 27.

FIG. 12 shows a flowchart illustrating the "photometry sensor output Bvd calculation procedure", which is called at S13 in the main procedure shown in FIG. 10.

In this procedure, data Bvad(i) (i=0, 1, . . . , 5) which represents A/D converted output voltages (analog data) of the photometry areas Ai (i=0, 1, . . . , 5) shown in FIG. 4 of the photometry sensor 9D for normal light is obtained. Further, data Bvad·g(i), Bvad·b(i) and Bvad·r(i), which represent A/D converted values of the output voltages of the photometry areas A1 (i=0, 1, 2, . . . 5) of each of the sensors 9G, 9B and 9R for color components, are obtained. Then, the A/D converted values Bvad(i) of the sensor 9D output are adjusted to brightness values Bvd(i) (S111). The A/D converted values Bvad·g(i), Bvad·b(i) and Bvad·r(i) are also adjusted to the brightness values Bvd·g(i), Bvd·b(i) and Bvd·r(i), respectively (S112). It should be noted that, in S111 and S112, the output voltage values (analog data) of the sensors 9D, 9G, 9B and 9R are converted into digital data representing corresponding data values in accordance with a well-known A/D conversion procedure.

FIG. 13 is a flowchart illustrating the "open aperture photometry compensation calculation procedure" which is called at S14 of the main procedure shown in FIG. 10.

At S121, an open aperture photometry compensation value Mnd1(i) is calculated based on the focal length, the exit pupil position, the open f-number and the aperture efficiency stored in the RAM 27. Compensation values mv1, mv2, mv3 and mv4 for compensating for shift amounts with respect to the reference photometry values due to the individual differences of the optical characteristics of the cameras, and due to the individual differences of the focal length, the exit pupil position, the open aperture and the aperture efficiency of each photographing lenses, are determined. Then, the sum of the compensation values mv1+mv2+mv3+mv4 is obtained, which is referred to as the open aperture compensation value Mnd1(i). Following the similar procedure, the open aperture compensation values Mnd1·g(i), Mnd1 b(i), and Mnd1 r(i) are calculated. Then the open aperture compensation value Mnd1(i) is added to the brightness value Bvd(i), and then the sum is determined as a new brightness value Bvd (i). Thus, the following calculation is executed at S121:

$$Bvd(i) = Bvd(i) + Mnd1(i).$$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

As a result, each brightness value is free from the affect of the individual differences of photographing lenses 2 when coupled to the camera body 1.

FIG. 14 is a flowchart illustrating an "exposure value calculating procedure", which is called at S15 of the main procedure.

In the "exposure value calculating procedure", the brightness values Bvd(i) are compensated in accordance with a photographing condition to obtain an appropriate exposure value Lvd. Specifically, in the "exposure value calculating procedure", the brightness values Bvd(i) (where i=0–5) corresponding to the photometry areas A0–A5 are compared with each other, or the brightness of the object as a whole is detected, and a condition of the object to be photographed (e.g., photographing with bright background behind an object, photographing at dusk, or photographing at night) is determined. Then, based on the determined photographing condition, the brightness values Bvd(i) are weighted, or one of the brightness values Bvd(i) is selected, and then the exposure value Lvd suitable to the photographing condition is determined. Various methods have been suggested for obtaining the exposure value, the following procedure is employed in the embodiment. That is, based on the brightness values Bvd(i), parameters for calculating the exposure value Lvd are calculated at S131. Then, the upper brightness limit of a parameter is calculated (S132), compensation value for the rear light is calculated (S133), weighting parameters are calculated (S134), a photographing magnification M is checked (S135), a photographing scene is judged (S136), a positive compensation value for a high brightness photographing scene is calculated (S137), and the exposure value Lvd is calculated based on the parameters obtained in S132–S137 and the parameters obtained in S131 (S138).

Conventionally, for calculating the exposure value Lvd, divided photometry, averaged photometry, center-weighted photometry, spot photometry and the like have been employed. Since such methods are well-known, detailed description will not be provided herein.

FIG. 15 is a flowchart illustrating a "colorimetry procedure" called at S16 of the main procedure.

In the "colorimetry procedure", the color of the object is detected, and a reflection compensation value CC is calculated in accordance with the detected color of the object.

At S21, calorimetric parameters are initialized (i.e., set to initial values). Depending on the color temperature of a light source illuminating the object, the colorimetric value varies. At S22, a "light source compensation procedure" is executed to obtain compensation values for the effects of the color temperature of the light source. At S23, a "light source difference compensation procedure" is executed to compensate for the calorimetric values using the compensation values obtained at S22. At S24, a "colorimetric parameter calculation procedure" for obtaining colorimetric parameters, which will be used for execution of a "color judgment procedure" is executed. At S25, a "calorimetric constant setting procedure" is executed to set constants used for color measurement. At S26, a "color judgment procedure" for judging a color based on the parameters and constants obtained in the preceding steps is executed.

Next, steps S22–S26 will be described in further detail.

FIG. 16 is a flowchart illustrating the "light source compensation procedure" called at S22 of FIG. 15. In the embodiment, when the initial Bvd value of the photometry sensors 9 is determined, a predetermined light source (i.e., light source A) for adjustment is used. When a photographing is to be executed in practice, the Bvd should be compensated in accordance with the actually used light source, for example, the sun light. In the procedure shown in FIG. 16, relative compensation values of B (blue) and R (red) components with respect to the value for the green component are obtained.

Specifically, for the color components G, B and R, light source data Bvd·light·g, Bvd·light·b, Bvd·light·r is read form the EEPROM 26 of the controller 20 (S141). Then, a light source adjustment value adj·sun·b for the photometry sensor 9B and a light source adjustment value adj·sun·r for the photometry sensor 9R with respect to the value for G component are read from the EEPROM 26 (S142). In the embodiment, the light source adjustment values are as follows (S145).

$$adj\cdot sun\cdot b=+8$$

$$adj\cdot sun\cdot r=-4$$

It should be noted that, if the adjustment of the sensors 9 is executed using the sun light instead of the predetermined light source A, the light source adjustment values are all zero.

Then, based on the light source data and the light source adjustment values, a light source compensation value light·gb for the photometry sensor 9B is obtained as follows (S143).

$$light\cdot gb=Bvd\cdot light\cdot g-Bvd\cdot light\cdot b+adj\cdot sun\cdot b$$

Similarly, alight source compensation value light gr for the photometry sensor 9R is obtained as follows (S144).

$$light\cdot gr=Bvd\cdot light\cdot g-Bvd\cdot light\cdot r+adj\cdot sun\cdot r$$

FIG. 17 is a flowchart illustrating the "light source difference compensation procedure", which is called at S23 in FIG. 15. In this procedure, based on the light source compensation values for B and R, obtained at S22, the light source difference compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd\cdot b(i)=Bvd\cdot b(i)+light\cdot gb$$

At S152, for each photometry area of the photometry sensor 9R, the following calculation is executed.

$$Bvd\cdot r(i)=Bvd\cdot r(i)+light\cdot gr$$

With the above compensation, the photometry sensors 9G, 9B and 9R has the same photometric characteristics for the sun light.

FIG. 18 is a flowchart illustrating the "colorimetric parameter calculation procedure", which is called at S24 of FIG. 15. In this procedure, colorimetric parameters used in the colorimetric judging are calculated. As the colorimetric parameters, parameters Gf(i) for G component, parameters Bf(i) for B component, and parameters Rf(i) for R component are calculated (S161, S162 and S163) according to the following formulae.

$$Gf(i)=Bvd\cdot g(i)-(Bvd\cdot b(i)+Bvd\cdot r(i))/2;$$

$$Bf(i)=Bvd\cdot b(i)-\{Bvd\cdot g(i)+Bvd\cdot r(i)\}/2;\ \text{and}$$

$$Rf(i)=Bvd\cdot r(i)-\{Bvd\cdot b(i)+Bvd\cdot g(i)\}/2.$$

FIG. 19 is a flowchart illustrating the colorimetric constant setting procedure, in which the colorimetric constants are read from the EEPROM 26. The colorimetric constants include:

threshold values for color judgment: THvalue.*1(i);

coefficients for color judgment: coefficient·#1(i) and coefficient·#2(i)

coefficients for calculating reflection compensation values: CCcoefficient*1(i);

adjustment values for calculating the reflection compensation values: CCadjustment.*1(i).

In the above indication, a symbol * represents g (green), b (blue), r (red), m (magenta), y (yellow) or c (cyan), and a symbol # represents g (green), b (blue) or r (red). In this procedure, for all the photometry areas A0–A5 of the sensors 9, the calorimetric constants are set, respectively. Therefore, at S171, i is set to zero (0), and then, if i≦5 (S172: YES), the constants are read from the EEPROM (S173, S174, S175 and S176). Then, at S177, i is incremented by one, and control returns to S172. Thus, for i=0 through 5, steps S173–S176 are repeated. The constants read from the EEPROM 26 are stored in the RAM 27 of the controller 20. FIG. 20 shows an example of the constants read from the EEPROM 26.

FIGS. 21 and 22 show a flowchart illustrating the "color judgment procedure". The procedure judges the color for each of the photometry areas A0–A5 of the photometry sensors 9G, 9B and 9R, and determines the color of the object for each photometry area A0–A5.

At S181, i is set to 0. Then, if i≦5 (S182: YES), the following steps are repeated. In the following description, Color(i) represents color parameters, Color·max(i) and Color·min(i) represent color judgment parameters, respectively.

At S183, the color parameter Color(i) is set to colorless. Then, at S184, Rf(i) and THvalue·c1(i) are compared.

If Rf(i)<THvalue·c1(i) (S184:YES), |Bf(i)−Gf(i)| and |coefficient·r1(i)×Rf(i)| are compared (S185).

If |Bf(i)−Gf(i)|<| coefficient·r1(i)×Rf(i)| (S185:YES), Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)>THvalue·m1(i) (S187:NO) or |Bf(i)−Rf(i)|≧|coefficient·g1(i)×Gf(i)| (S188:NO), step S189 is skipped.

At S190, Gf(i) is compared with Thvalue·g1(i).

If Gf(i)>THvalue·g1(i) (S190:YES), |Bf(i)−Rf(i)| and |coefficient·g2(i)×Gf(i)| are compared (S119).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)·THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(i)≦THvalue·r1(i) (S196:NO) or |Bf(1)−Gf(i)|>|coefficient·r2(1)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i)×Bf(i)| are compared (S200).

If |Gf(i)−Rf(i)|<|coefficient·b1(i)×Bf(i)| (S200:YES), Color·min(i) is set to Bf(1) (S201). If Bf(i)>THvalue·y1(i) (S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202, color·min(i) and Rf(i) are compared. If color·min(i) is equal to Rf(i) (S202:YES), color(i) is set to cyan (S203). If color·min(i) is not equal to Rf(i), color·min(i) and Gf(i) are compared at S204. If color·min(i) is equal to Gf(i) (S204:YES), color(i) is set to magenta (S205). If color·min(i) is not equal to Gf(i), color·max(i) and Gf(i) are compared at S206. If color·max(i) is equal to Gf(i) (S206:YES), color(i) is set to green (S207). If color·max(i) is not equal to Gf(i) (S206:NO), then color·max(i) and Bf(i) are compared at S208. If color·max(i) is equal to Bf(i), color(i) is set to blue (S209). If color·max(1) is not equal to Bf(i) (S208:NO), then color·max(i) is compared with Rf(i) at S210. If color·max(i) is equal to Rf(i) (S210:YES), then color(i) is set to red (S211) If color·max(i) is not equal to Rf(i) (S210:NO), then color·min(i) is compared with Bf(i) at S212. If color·min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182. As a result of the above-described procedure, Yellow has the highest priority, and in the foregoing steps, the color finally selected in accordance with the conditions is determined as the color of the photometry area.

FIG. 23 is a flowchart illustrating an example of the "reflection compensation value calculation procedure", which is called at S17 of the main colorimetry procedure in FIG. 10.

In this procedure, the reflection compensation values CC(i) corresponding to the difference of the color among the photometry areas are calculated. In the example shown in FIG. 23, the compensation values CC(i) are determined by selecting values from among predetermined values.

At S221, i is set to an initial value of zero. At S222, it is judged whether i is smaller than five. If i is 0, 1, 2, 3, 4 or 5, (S222:YES), it is judged whether color(i) is colorless (S223). If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), CC(i) is calculated using the following formula (S226).

$$CC(i)=CCcoefficient·c1(i)\times(Rf(i)-THvalue·c1(i))+CCadjustment·c1(i)$$

If color(i) is not cyan (S225:NO), then step S226 is skipped. At S227, it is judged whether color(i) is magenta. If color(i) is magenta (S227:YES), CC(i) is calculated using the following formula (S228).

$$CC(i)=Cccoefficient·m1(i)\times(Gf(i)-THvalue·m1(i))+CCadjustment·m1(i)$$

If color(i) is not magenta (S227:NO), then step S228 is skipped. At S229, it is judged whether color(i) is green. If color(i) is green (S229:YES), CC(i) is calculated using the following formula (S230).

$$CC(i)=CCcoefficient·g1(i)\times(Gf(i)-THvalue·g1(i))+CCadjustment·g1(i)$$

If color(i) is not green (S229:NO), then step S230 is skipped. At S231, it is judged whether color(i) is blue. If color(i) is blue (S231:YES), CC(i) is calculated using the following formula (S232).

$$CC(i)=Cccoefficient·b1(i)\times(Bf(i)-THvalue·b1(i))+CCadjustment·b1(i)$$

If color(i) is not blue (S231:NO), then step S232 is skipped. At S233, it is judged whether color(i) is red. If color(i) is red (S233:YES), CC(i) is calculated using the following formula (S234).

$$CC(i)=CCcoefficient·r1(i)\times(Rf(i)-THvalue·r1(i))+Ccadjustment·r1(i)$$

If color(i) is not red (S233:NO), then step S234 is skipped. At S235, it is judged whether color(i) is yellow. If color(i) is yellow (S235:YES), CC(i) is calculated using the following formula (S236).

$$CC(i)=CCcoefficient·y1(i)\times(Bf(i)-THvalue·y1(i))+Ccadjustment·y1(i)$$

If color(i) is not yellow (S235:NO), then step S236 is skipped. Then, at S237, i is incremented by one, and control returns to S222 (i.e., the above steps are repeated for i=0–5). As a result, the reflection compensation values CC(i) for the photometry areas A0–A5 are calculated, respectively.

Further, when the judgment of the reflection compensation value CC at the photometry area A5 is finished, i=6. Therefore, when control proceeds from S237 to S222, judgment at S222 is NO. Thus, based on the obtained reflection compensation value CC(i), the CC calculation for obtaining the reflection compensation value CC as a representative value is performed (S250). In the CC calculation, the reflection compensation value CC is obtained by performing a simple averaging, center-weighted averaging, or selecting the maximum value, or the like (S251). Specifically, the averaging is a mere averaging of the CC(i) for respective photometry areas, which Is calculated by the following equation:

$$CC-(CC(0)+CC(1)+CC(2)+CC(3)+CC(4)+CC(5))/6.$$

The center-weighted averaging is an averaging calculation by applying greater weighting to the photometry value for the photometry areaA0 than the values for the other photometry areas. That is, for example:

$$CC=(CC(0)\times 4+CC(5)+(CC(1)+CC(2)+CC(3)+CC(4))\times 3/4)/8.$$

Alternatively, the maximum value can be selected from among the reflection compensation values CC(i). That is, $$CC=max(CC(0), CC(1), CC(2), CC(3), CC(4), CC(5)).$$

When the center-weighted method is employed, the values CC(i) corresponding to the photometry areas where the distance measuring points used for multi-points distance measuring device 8 may be assigned with greater weighting. For example, when the multi-points distance measuring device measures distances at points P0, P1 and P2, the photometry areas A0, A1 and A2 are selected. In such a case, for the values CC(i) corresponding to the areas A(0), A(1) and A(2), larger weighting is assigned when the weighted averaging is performed. Alternatively, one or more compensation values CC(i) are selected so that the reflection compensation values are optimized with respect to the areas corresponding to focused portions of the object.

Regarding light emission of the auto strobe device 28, a control level adjusting procedure (S18) is executed for compensating for the strobe control level SXVD of the auto strobe device 28 using the reflection compensation values CC which was obtained in the reflection compensation value calculation procedure. As shown in FIG. 25, in accordance with the exposure value Lvd calculated in the exposure value calculation procedure shown in FIG. 10, it is judged whether photographing using the strobe light is to be execute (S261). If it is judged the strobe light is necessary, the strobe control levels SXVD, which is a conversion factor of the D/A converter 102 for setting the TTL reference voltage Vtt1 of the auto strobe device 28, is set (S262). When the strobe control level SXVD is set, the second switch SW2 should be turned ON or OFF in accordance with the sensitivity of a film that employed. Thereafter, the thus set strobe control level SXVD is compensated for using the reflection compensation value CC which was determined at the reflection compensation value calculation procedure. That is, $$SXVD=SXVD+CC.$$

When the release switch SWR is turned ON, and the strobe photographing using the auto strobe device 28 is performed in the exposure control procedure (S20), the light amount emitted by the auto strobe device 28 is controlled by the TTL reference voltage Vtt1, which is set in accordance with the compensated strobe control level SXVD. In other words, the light amount of the auto strobe device 28 is optimized in accordance with the differences of reflectivity of objects due to the difference of colors of objects.

As above, by adjusting the strobe control level SXVD which is used as a reference for determining the appropriate exposure amount when the strobe photographing is executed in accordance with the color of the object, regardless of the color of the object and therefore regardless of the reflectivity of the object, the strobe photographing can be performed with appropriate amount of strobe light.

Specifically, when the color of the object is judged to be yellow in accordance with the output of the colorimetric unit, the strobe control level is adjusted in a direction where the object will be over exposed, and if the object color is determined to be blue or red, then the strobe control level is adjusted in a direction where the object will be under exposed. With this configuration, the error in exposure due to the differences of color of the objects can be resolved. Further, in the embodiment, a light receiving surface of each sensor is divided into a plurality of photometry areas, and the colorimetry is performed using the outputs of the divided photometry areas. Therefore in either of the cases where the color of the object is consider to be a certain single color or where the object includes a plurality of parts having a plurality of different colors, it is possible to determine an appropriate exposure value.

Figure 3B:
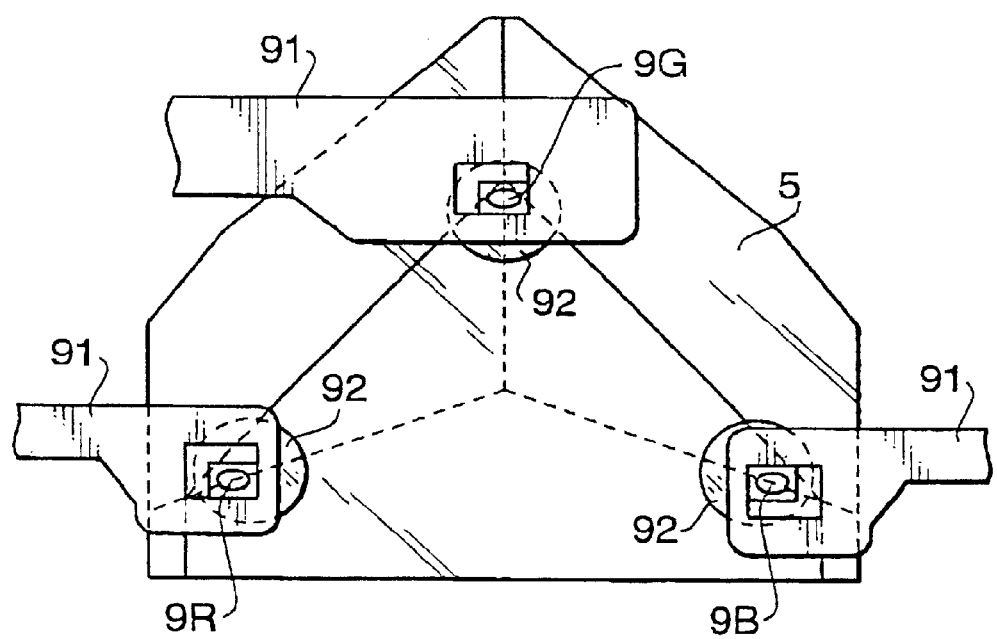
FIG. 3B shows an alternative arrangement of photometry sensors.

In the embodiment described above, the sensor 9D for the normal light is provided in addition to the sensors 9B, 9G and 9R for B, G and R color components. The light receiving characteristics of the sensor G has a peak at the wavelength of 540 nm. This characteristic is close to that of the sensor 9D. Therefore, the sensor 9G is used instead of the sensor 9D, and the sensor 9D is omitted, as shown in FIG. 3B. In such a case, in steps S11–S14 of the main procedure (FIG. 10), the output Bvad-g of the sensor 9G is used as Bvad, and the calculation is to be executed.

With such a structure, since the number of the sensors is reduced, the manufacturing cost can be reduced. Further, a space necessary for arranging the sensors can be reduced, which enables downsizing of the camera body.

The present disclosure relates to the subject matters contained in Japanese Patent Applications No. 2000-119661 filed on Apr. 20, 2000, and No. 2000-239415, filed on Aug. 8, 2000, which are expressly incorporated herein by reference in their entirety.

What is claimed is:

1. A strobe control device for a camera, comprising:
    a light amount measuring system that measures an amount of light emitted by a strobe and reflected by an object;
    a comparing system that compares the measured light amount with a reference exposure light amount, said reference exposure light amount being determined in accordance with a reference control level, said strobe being controlled to stop emitting light when the measured light amount reaches said reference exposure light amount;
    a colorimetry system that determines a color of the object;
    a reflection compensation value determining system that determines a compensation value for compensating for errors depending on he color of an object; and
    a compensation system that compensates for said reference control level in accordance with the reflection compensation value.

2. The strobe control device according to claim 1, wherein said colorimetry system includes a photometry sensor for metering a blue light component, a photometry sensor for metering a green light component, and a photometry sensor for metering a red light component.

3. The strobe control device according to claim 1, wherein said colorimetry system includes a light receiving surface divided into a plurality of light receiving areas, color of the object being measured in each of the areas, and wherein said reflection compensation value determining system determines said compensation value based on a colorimetry value of the object in said each of the areas.

4. The strobe control device according to claim 1, further comprising:
    a light emission circuit that drives the strobe to emit light;
    a detector that outputs an electrical current upon receipt of the light reflected by the object;
    a TTL integration circuit that integrates the output of said detector, said light emission circuit stops the light emission when an output voltage of the TTL integration circuit reaches a TTL reference voltage, said TTL reference voltage being set corresponding to said reference exposure amount, said reference control level being a control level for setting said TTL reference voltage.

5. The strobe control device according to claim 4, wherein said TTL integration circuit includes:
- a charging circuit that accumulates electric charges corresponding to the measured light amount and outputs a charged voltage corresponding to the accumulated electric charges;
- a D/A converter that generates the TTL reference voltage based on a value of said reference control level; and
- a comparing circuit that compares the charged voltage with the TTL reference voltage, and outputs a quench signal for stopping the light emission of the light emission circuit when the charged voltage exceeds said TTL reference voltage.

6. The strobe control device according to claim 5, wherein said charging circuit outputs the charged voltage as a difference with respect to the reference voltage, and wherein said D/A converter generates said TTL reference voltage as a difference with respect to the reference voltage in accordance with said reference control level.

7. The strobe control device according to claim 5, wherein said charging circuit includes a voltage dividing circuit that divides said charged voltage, one of said charged voltage and a divided voltage, which has been divided by said voltage dividing circuit, being selectively applied to said comparing circuit as the charged voltage.

8. The strobe control device according to claim 1, comprising a normal light detecting system that performs photometry with respect to the object, a strobe photographing using the strobe control device to be performed being determined based on a measured value of said normal light detecting system.

9. The strobe control device according to claim 8, wherein said camera is a single lens reflex camera having a pentagonal prism, wherein said calorimetric system and said normal light detecting system are arranged on an eyepiece optical system side with respect to the pentagonal prism, said normal light detecting system facing an upper central portion of said pentagonal prism.

10. The strobe control device according to claim 2, wherein said green photometry sensor is used as said normal light detecting system, an output of said green photometry sensor being used as the output of the normal light detecting system.

11. The strobe control device according to claim 8, wherein said normal light detecting system that performs photometry with respect to the object generates an exposure value, and wherein said exposure value is not compensated in accordance with the reflection compensated value.

12. The strobe control device according to claim 8, wherein said normal light detecting system that performs photometry with respect to the object generates an exposure value, and the compensation system uses the reflection compensation value only to compensate the reference control level, and the compensation system does not use the reflection compensation value to compensate the reference control level.

* * * * *